United States Patent
Natanzon et al.

(10) Patent No.: US 11,113,153 B2
(45) Date of Patent: Sep. 7, 2021

(54) METHOD AND SYSTEM FOR SHARING PRE-CALCULATED FINGERPRINTS AND DATA CHUNKS AMONGST STORAGE SYSTEMS ON A CLOUD LOCAL AREA NETWORK

(71) Applicant: EMC IP Holding Company LLC, Hopkinton, MA (US)

(72) Inventors: Assaf Natanzon, Tel Aviv (IL); Simon Zhang, Chengdu Sichuan (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 556 days.

(21) Appl. No.: 15/661,682

(22) Filed: Jul. 27, 2017

(65) Prior Publication Data

US 2019/0034289 A1    Jan. 31, 2019

(51) Int. Cl.
*G06F 16/903* (2019.01)
*G06F 11/14* (2006.01)
(Continued)

(52) U.S. Cl.
CPC .......... *G06F 11/1453* (2013.01); *G06F 3/067* (2013.01); *G06F 3/0608* (2013.01);
(Continued)

(58) Field of Classification Search
CPC ............... G06F 3/0641; G06F 11/1453; G06F 16/1752; G06F 16/1748; G06F 16/1744; G06F 2212/1044; G06F 16/90344
See application file for complete search history.

(56) References Cited

U.S. PATENT DOCUMENTS 7,085,911 B2  8/2006  Sachedina et al.
7,818,515 B1  10/2010  Umbehocker et al.
(Continued)

FOREIGN PATENT DOCUMENTS

EP  2738665 A1  6/2014
EP  2810171 B1  7/2019
(Continued)

OTHER PUBLICATIONS

Extended European Search Report issued in corresponding European Application No. 18184842.5, dated Sep. 19, 2018.
(Continued)

*Primary Examiner* — Marcin R Filipczyk
(74) *Attorney, Agent, or Firm* — Chamberlain, Hrdlicka, White, Williams & Aughtry

(57) ABSTRACT

A method and system for sharing pre-calculated fingerprints and data chunks amongst storage systems on a cloud local area network. Specifically, the disclosed method and system extend the functionality of data deduplication storage systems to include querying other data deduplication storage systems on the cloud local area network for fingerprints, corresponding to data chunks, when these fingerprints and data chunks are not stored locally. The transfer of data chunks between one data deduplication storage system to another through the cloud local area network may be a faster and cheaper alternative to the transfer of data chunks between a data deduplication storage system and a client through a wide area network.

14 Claims, 13 Drawing Sheets

(51) Int. Cl.
*G06F 16/951* (2019.01)
*G06F 16/23* (2019.01)
*G06F 3/06* (2006.01)
*G06F 16/174* (2019.01)
*G06F 16/22* (2019.01)
*H04L 29/06* (2006.01)

(52) U.S. Cl.
CPC ........ *G06F 3/0641* (2013.01); *G06F 11/1464* (2013.01); *G06F 16/1748* (2019.01); *G06F 16/2255* (2019.01); *G06F 16/2365* (2019.01); *G06F 16/951* (2019.01); *H04L 63/123* (2013.01); *G06F 16/1752* (2019.01); *G06F 16/90344* (2019.01); *G06F 2201/80* (2013.01)

(56) References Cited

U.S. PATENT DOCUMENTS

| | | | |
|---|---|---|---|
| 8,046,551 B1 | 10/2011 | Sahin | |
| 8,190,835 B1 | 5/2012 | Yueh | |
| 8,204,868 B1 | 6/2012 | Wu et al. | |
| 8,396,841 B1 | 3/2013 | Janakiraman | |
| 8,732,403 B1 | 5/2014 | Nayak | |
| 8,782,323 B2 | 7/2014 | Glikson et al. | |
| 8,898,114 B1 | 11/2014 | Feathergill et al. | |
| 8,898,120 B1 | 11/2014 | Efstathopoulos | |
| 8,904,120 B1 | 12/2014 | Killammsetti et al. | |
| 8,918,390 B1 | 12/2014 | Shilane et al. | |
| 8,943,032 B1 | 1/2015 | Xu et al. | |
| 8,949,208 B1 | 2/2015 | Xu et al. | |
| 9,183,200 B1 | 11/2015 | Liu et al. | |
| 9,244,623 B1 | 1/2016 | Bent et al. | |
| 9,250,823 B1 | 2/2016 | Kamat et al. | |
| 9,251,160 B1 | 2/2016 | Wartnick | |
| 9,274,954 B1 | 3/2016 | Bairavasundaram et al. | |
| 9,280,550 B1 | 3/2016 | Hsu et al. | |
| 9,298,724 B1 | 3/2016 | Patil et al. | |
| 9,317,218 B1 | 4/2016 | Botelho et al. | |
| 9,336,143 B1 | 5/2016 | Wallace et al. | |
| 9,390,116 B1 | 7/2016 | Li et al. | |
| 9,390,281 B2 * | 7/2016 | Whaley | G06F 21/6218 |
| 9,424,185 B1 | 8/2016 | Botelho et al. | |
| 9,442,671 B1 | 9/2016 | Zhang et al. | |
| 9,830,111 B1 | 11/2017 | Patiejunas et al. | |
| 9,952,933 B1 | 4/2018 | Zhang | |
| 10,002,048 B2 | 6/2018 | Chennamsetty et al. | |
| 10,031,672 B2 | 7/2018 | Wang et al. | |
| 10,078,451 B1 | 9/2018 | Floyd et al. | |
| 10,102,150 B1 | 10/2018 | Visvanathan et al. | |
| 10,175,894 B1 | 1/2019 | Visvanathan et al. | |
| 10,445,292 B1 | 10/2019 | Zhang et al. | |
| 2003/0110263 A1 | 6/2003 | Shillo | |
| 2005/0120058 A1 | 6/2005 | Nishio | |
| 2005/0160225 A1 | 7/2005 | Presler-Marshall | |
| 2005/0182906 A1 | 8/2005 | Chatterjee et al. | |
| 2006/0075191 A1 | 4/2006 | Lolayekar et al. | |
| 2008/0082727 A1 | 4/2008 | Wang | |
| 2008/0133446 A1 | 6/2008 | Dubnicki et al. | |
| 2008/0133561 A1 | 6/2008 | Dubnicki et al. | |
| 2008/0216086 A1 | 9/2008 | Tanaka et al. | |
| 2008/0244204 A1 | 10/2008 | Cremelie et al. | |
| 2009/0235115 A1 | 9/2009 | Butlin | |
| 2009/0271454 A1 | 10/2009 | Anglin et al. | |
| 2010/0049735 A1 | 2/2010 | Hou | |
| 2010/0094817 A1 | 4/2010 | Ben-Shaul et al. | |
| 2010/0250858 A1 | 9/2010 | Cremelie et al. | |
| 2011/0055471 A1 | 3/2011 | Thatcher et al. | |
| 2011/0099200 A1 * | 4/2011 | Blount | G06F 16/152 707/770 |
| 2011/0099351 A1 | 4/2011 | Condict | |
| 2011/0161557 A1 | 6/2011 | Haines et al. | |
| 2011/0185149 A1 | 7/2011 | Gruhl et al. | |
| 2011/0196869 A1 | 8/2011 | Patterson et al. | |
| 2011/0231594 A1 | 9/2011 | Sugimoto et al. | |
| 2011/0276781 A1 | 11/2011 | Sengupta et al. | |
| 2012/0158670 A1 | 6/2012 | Sharma et al. | |
| 2012/0209873 A1 | 8/2012 | He | |
| 2012/0278511 A1 | 11/2012 | Alatorre et al. | |
| 2013/0036098 A1 | 2/2013 | Mutalik et al. | |
| 2013/0055018 A1 | 2/2013 | Joshi et al. | |
| 2013/0060739 A1 | 3/2013 | Kalach et al. | |
| 2013/0111262 A1 | 5/2013 | Taylor et al. | |
| 2013/0138620 A1 | 5/2013 | Yakushev et al. | |
| 2014/0012822 A1 | 1/2014 | Sachedina et al. | |
| 2014/0040205 A1 | 2/2014 | Cometto et al. | |
| 2014/0047181 A1 | 2/2014 | Peterson et al. | |
| 2014/0101113 A1 | 4/2014 | Zhang | |
| 2014/0201169 A1 | 7/2014 | Liu | |
| 2014/0258248 A1 | 9/2014 | Lambright et al. | |
| 2014/0258824 A1 | 9/2014 | Khosla et al. | |
| 2014/0281215 A1 | 9/2014 | Chen et al. | |
| 2014/0310476 A1 | 10/2014 | Kruus | |
| 2015/0074679 A1 | 3/2015 | Fenoglio et al. | |
| 2015/0106345 A1 * | 4/2015 | Trimble | G06F 16/1748 707/692 |
| 2015/0178171 A1 | 6/2015 | Bish et al. | |
| 2015/0331622 A1 | 11/2015 | Chiu et al. | |
| 2016/0026652 A1 | 1/2016 | Zheng | |
| 2016/0112475 A1 | 4/2016 | Lawson et al. | |
| 2016/0188589 A1 | 6/2016 | Guilford et al. | |
| 2016/0224274 A1 | 8/2016 | Kato | |
| 2016/0239222 A1 | 8/2016 | Shetty et al. | |
| 2016/0323367 A1 | 11/2016 | Murtha et al. | |
| 2016/0342338 A1 | 11/2016 | Wang | |
| 2017/0093961 A1 | 3/2017 | Pacella et al. | |
| 2017/0199894 A1 | 7/2017 | Aronovich et al. | |
| 2017/0220281 A1 | 8/2017 | Gupta et al. | |
| 2017/0220334 A1 | 8/2017 | Hart et al. | |
| 2017/0300424 A1 | 10/2017 | Beaverson et al. | |
| 2017/0352038 A1 | 12/2017 | Parekh et al. | |
| 2017/0359411 A1 | 12/2017 | Burns et al. | |
| 2018/0089037 A1 | 3/2018 | Liu et al. | |
| 2018/0146068 A1 | 5/2018 | Johnston et al. | |
| 2018/0267896 A1 * | 9/2018 | Zhang | G06F 3/061 |
| 2018/0322062 A1 | 11/2018 | Watkins et al. | |

FOREIGN PATENT DOCUMENTS

| | | |
|---|---|---|
| WO | 2013056220 A1 | 4/2013 |
| WO | 2013115822 A1 | 8/2013 |
| WO | 2014185918 A1 | 11/2014 |

OTHER PUBLICATIONS

Jaehong Min et al.; "Efficient Deduplication Techniques for Modern Backup Operation"; IEEE Transactions on Computers; vol. 60, No. 6; pp. 824-840; Jun. 2011.

Daehee Kim et al.; "Existing Deduplication Techniques"; Data Depublication for Data Optimization for Storage and Network Systems; Springer International Publishing; DOI: 10.1007/978-3-319-42280-0_2; pp. 23-76; Sep. 2016.

International Search Report and Written Opinion issued in corresponding PCT Application PCT/US2018/027646, dated Jul. 27, 2018. (30 pages).

Extended European Search Report issued in corresponding European Application No. 18185076.9, dated Dec. 7, 2018 (9 pages).

Lei Xu et al.; "SHHC: A Scalable Hybrid Hash Cluster for Cloud Backup Services in Data Center"; 2011 31st International Conference on Distributed Computing Systems Workshops (ICDCSW); IEEE Computer Society; pp. 61-65; 2011 (5 pages).

Deepavali Bhagwat et al.; "Extreme Binning: Scalable, Parallel Deduplication for Chunk-based File Backup"; IEEE Mascots; Sep. 2009 (10 pages).

Mark Lillibridge et al.; "Sparse Indexing: Large Scale, Inline Deduplication Using Sampling and Locality"; 7th Usenix Conference on File and Storage Technologies, Usenix Association; pp. 111-pp. 123; 2009 (13 pages).

International Search Report and Written Opinion issued in corresponding WO application No. PCT/US2018/027642, dated Jun. 7, 2018 (15 pages).

(56) References Cited

OTHER PUBLICATIONS

Aseem Kishore; "What is a Checksum and How to Calculate a Checksum"; Online Tech Tips; Feb. 18, 2015; https://www.online-tech-tips.com/cool-websites/what-is-checksum/.

* cited by examiner

METHOD AND SYSTEM FOR SHARING PRE-CALCULATED FINGERPRINTS AND DATA CHUNKS AMONGST STORAGE SYSTEMS ON A CLOUD LOCAL AREA NETWORK

BACKGROUND

When considering the deployment of software and/or data to the cloud, data traffic between the cloud and systems external to the cloud may be exchanged at substantially slower speeds and at a greater expense than the exchange of data traffic between systems internal to the cloud.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-8, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to a method and system for sharing pre-calculated fingerprints and data chunks amongst storage systems on a cloud local area network. Specifically, one or more embodiments of the invention extend the functionality of data deduplication storage systems to include querying other data deduplication storage systems on the cloud local area network for fingerprints, corresponding to data chunks, when these fingerprints and data chunks are not stored locally. The transfer of data chunks between one data deduplication storage system to another through the cloud local area network may be a faster and cheaper alternative to the transfer of data chunks between a data deduplication storage system and a client through a wide area network.

Figure 1:
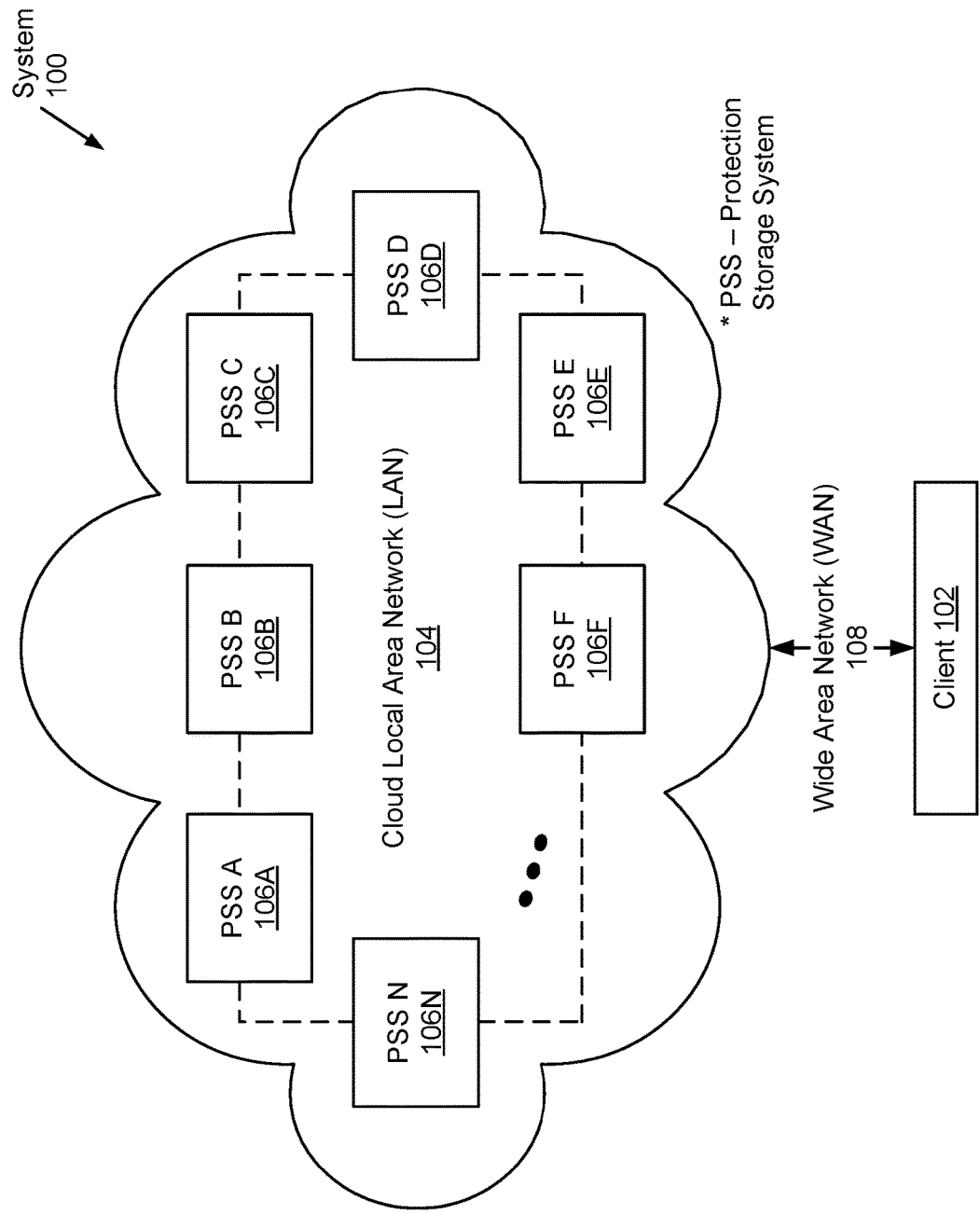
FIG. 1 shows a system in accordance with one or more embodiments of the invention.

FIG. 1 shows a system in accordance with one or more embodiments of the invention. The system (100) includes a client (102) operatively connected to a cloud local area network (LAN) (104) by way of a wide area network (WAN) (108). Further, the cloud LAN (104) includes a set of protection storage systems (PSSs) (106A-106N). Each of these components is described below.

In one embodiment of the invention, the client (102) may be any computing system (see e.g., FIG. 8) programmed to interact with at least one or more PSSs (106A-106N). Specifically, the client (102) may include functionality to: (i) generate and submit backup requests (for data chunk storage) to one or more PSSs (106A-106N), where a backup request includes a fingerprint (discussed below); (ii) provide, to one or more PSSs (106A-106N), a data chunk for storage associated with the fingerprint when the one or more PSSs (106A-106N) advise that not one PSS (106A-106N) has the fingerprint catalogued/stored in their respective local fingerprint database (see e.g., FIG. 2); and (iii) receive backup responses from one or more PSSs (106A-106N) that may indicate that at least one PSS (106A-106N) is already storing the data chunk for the provided fingerprint, entailing that the client (102) does not need to upload the data chunk to the one or more PSSs (106A-106N). By way of examples, the client (102) may be a desktop computer, a laptop computer, a smartphone, a server, a mainframe computer, a datacenter terminal, etc.

Figure 8:
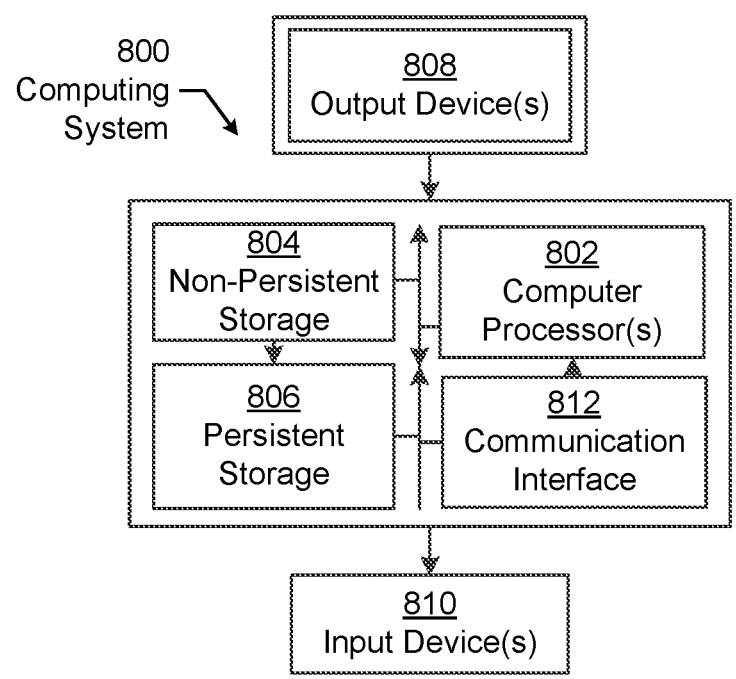
FIG. 8 shows a computing system in accordance with one or more embodiments of the invention.

In one embodiment of the invention, the cloud LAN (104) may be a cloud-based (i.e., Internet-based) network or cluster of interconnected computing systems (see e.g., FIG. 8). Collectively, the cloud LAN (104) may include functionality to provide shared computer processing and storage resources, in the form of services and applications, to one or more clients (102). In one embodiment of the invention, the cloud LAN (104) includes a set (e.g., two or more) of PSSs (106A-106N) (described below). The cloud LAN (104) may further include additional components (not shown), such as, for example, network switches, network routers, servers, and other types of computing systems, which may: (i) facilitate communication and the exchange of information between the various interconnected computing systems forming the cloud LAN (104); and/or (ii) provide at least a portion of the above-mentioned shared computer processing and storage resources. Moreover, in one embodiment of the invention, the interconnected computing systems of the cloud LAN (104) may be directly or indirectly connected to each other using any combination of wired or wireless connections, which may be enabled by any combination of existing or future-developed wired and/or wireless communication protocols.

In one embodiment of the invention, a protection storage system (PSS) (106A-106N) may be a back-end data repository implemented using any type of storage unit and/or device (e.g., a file system, database, collection of tables, or any other storage mechanism). A PSS (106A-106N) may be implemented using multiple storage units and/or devices, which may or may not be of the same type or located at the same physical site. In one embodiment of the invention, a PSS (106A-106N) may be implemented using one or more servers. Further, a PSS (106A-106N) may include functionality to maintain, manage, or otherwise backup data. More specifically, a PSS (106A-106N) may include functionality to store de-duplicated data. De-duplicated data may refer to data that has undergone deduplication prior to storage. One of ordinary skill will appreciate that deduplication refers to a data compression technique directed at eliminating duplicate data blocks (or chunks), and thus focuses on storing only unique data blocks (or chunks). In one embodiment of the invention, a PSS (106A-106N) may include persistent storage. Examples of persistent storage hosted on a PSS (106A-106N) include, but are not limited to, optical storage, magnetic storage, NAND Flash memory, NOR Flash memory, Magnetic RAM memory (M-RAM), Spin Torque Magnetic RAM memory (ST-MRAM), Phase Change memory (PCM), and any other memory defined as a non-volatile Storage Class memory (SCM). PSSs (106A-106N) are described in further detail below with respect to FIG. 2.

In one embodiment of the invention, the client (102) and the cloud LAN (104) may be operatively connected to one another by way of a WAN (108). The WAN (108) may be network or cluster of interconnected LANs, where the aforementioned cluster of interconnected LANs includes at least the cloud LAN (104) and a LAN (not shown) on which the client (102) resides. Components (e.g., computing systems (see e.g., FIG. 8)) of the WAN (108) may be directly or indirectly connected to each other using any combination of wired or wireless connections. In embodiments in which these components are indirectly connected to one another, there may be other network infrastructure components or systems (e.g., switches, routers, servers, etc.) that facilitate communication and information exchange between these components. Moreover, these components may communicate with each other using any combination of wired and/or wireless communication protocols.

While FIG. 1 shows a configuration of components, other system configurations may be used without departing from the scope of the invention. For example, in one embodiment of the invention, the system (100) may further include a PSS registration platform (PRP) (not shown). In such an embodiment, the PRP may be a hardware and/or software implemented service that provides the centralized management of the PSSs (106A-106N). As such, the PRP may include functionality to: (i) receive registration packets (described below) from newly installed PSSs (106A-106N); (ii) register (i.e., create registration entries) newly installed PSSs (106A-106N) based on at least a portion of contents included in the received registration packets; (iii) share information (e.g., a PSS ID, a media access control (MAC) address, an Internet Protocol (IP) address, etc.) associated with newly installed PSSs (106A-106N) with existing PSSs (106A-106N) on the cloud LAN (104); and (iv) share similar information associated with the existing PSSs (106A-106N) on the cloud LAN (104) with the newly installed PSSs (106A-106N). The PRP may execute additional functionalities without departing from the scope of the invention. Moreover, the PRP may be hosted on a physical server (e.g., in a data center, or on a virtual server that may be cloud-based). The PRP may be hosted on a single server, or alternatively, on multiple servers that are physical, virtual, or a combination thereof. In one embodiment of the invention, the PRP may be hosted on any of one or more computing systems similar to the exemplary computing systems shown in FIG. 8.

Figure 2:
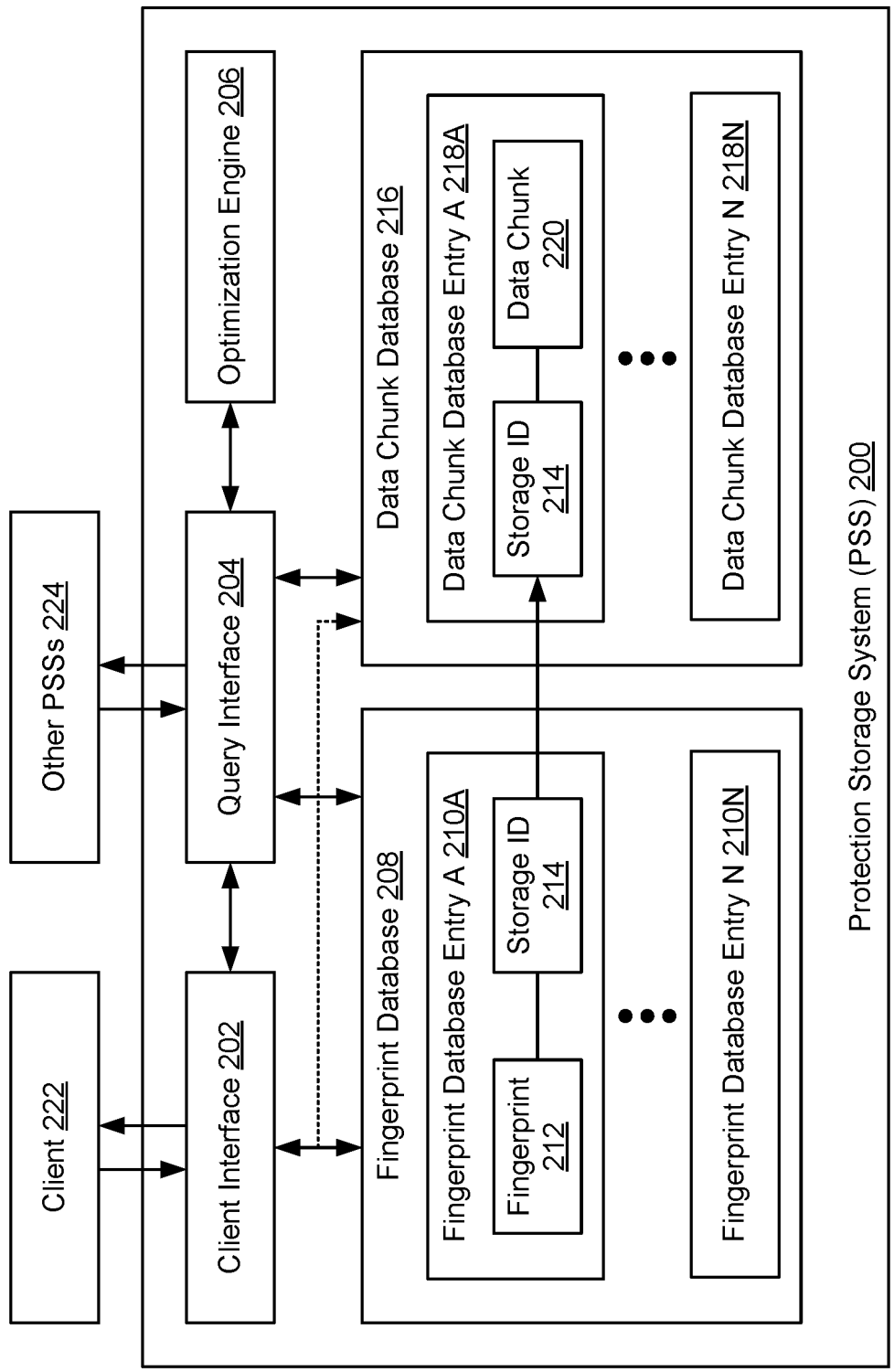
FIG. 2 shows a protection storage system in accordance with one or more embodiments of the invention.

FIG. 2 shows a protection storage system (PSS) in accordance with one or more embodiments of the invention. The PSS (200) includes a client interface (202), a query interface (204), an optimization engine (206), a fingerprint database (208), and a data chunk database (216). Each of these components is described below.

In one embodiment of the invention, the client interface (202) may be a communication interface for enabling and facilitating the exchange of information to and from one or more clients (222). The client interface (202) may be implemented using hardware, software, firmware, or any combination thereof. Further, the client interface (202) may include functionality, by way of any WAN-based wired and/or wireless communication medium and protocol, to: (i) receive backup requests and data chunks from a client (222); and (ii) transmit backup responses to a client (222). In one embodiment of the invention, the client interface (202) may be a web application program interface (API), which may be accessed by one or more clients (222) through a webpage and a WAN-based connection. Examples of the client interface (202) include, but are not limited to, a network interface controller/device, a network socket, one or more computer ports, etc.

In one embodiment of the invention, the query interface (204) may be a communication interface for enabling and facilitating the exchange of information to and from one or more other PSSs (224) on the cloud LAN (see e.g., FIG. 1). The query interface (204) may be implemented using hardware, software, firmware, or any combination thereof. Further, the query interface (202) may include functionality, by way of any LAN-based wired and/or wireless communication medium and protocol, to: (i) transmit fingerprint queries and fingerprints to one or more other PSSs (224); and (ii) receive query responses and data chunks from one or more other PSSs (224). In one embodiment of the invention, the query interface (204) may further enable communications with any other computing system (not shown) on the cloud LAN. Subsequently, the query interface (204) may include further functionality to transmit and receive network packets (e.g., data packets, address resolution protocol (ARP) packets, registration packets, etc.) to/from any computing system (including other PSSs (224) and/or the PRP (not shown)) in order to, for example, discover other PSSs (224) (see e.g., FIGS. 3A and 3B), and register the PSS (200) (see e.g., FIGS. 4A and 4B). In one embodiment of the invention, the query interface (204) may be a web API, which may be accessed using a LAN-based connection. Examples of the query interface (204) include, but are not limited to, a network interface controller/device, a network socket, one or more computer ports, etc.

In one embodiment of the invention, the optimization engine (206) may be at least a computer process (i.e., at least an instance of a computer program) executing on the underlying hardware (e.g., one or more integrated circuits (not shown)) of the PSS (200). Specifically, the optimization engine (206) may be at least a computer process dedicated to the execution of one or more optimization protocols (see e.g., FIGS. 6A and 6B). More specifically, the optimization engine (206) may include functionality to: (i) compute and record statistics and/or metrics (e.g., fingerprint hit probabilities (FHPs) (discussed below)) for each other PSS (224) on the cloud LAN based at least in part on query responses received from each other PSS (224); and (ii) identify one or more other PSSs (224) as recipients of future fingerprint queries generated and transmitted by the query interface (204) based on at least a portion of the recorded statistics and/or metrics.

In one embodiment of the invention, the fingerprint database (208) may be a repository that maintains one or more fingerprint database entries (210A-210N). Each fingerprint database entry (210A-210N) may store a mapping relating a fingerprint (212) to a storage ID (214). Furthermore, the fingerprint database (208) may be programmed by a PSS kernel (not shown) (i.e., an integrated circuit, or a core computer program executing on the integrated circuit) based on the allocation or deallocation of data chunk database entries (218A-218N).

In one embodiment of the invention, a fingerprint (212) may be a digital signature (i.e., a bit string or a string of characters including letters, numbers, symbols, etc.) that uniquely identifies a data chunk (220). The fingerprint (212) may be calculated by submitting the data chunk (220) through a hash function (not shown), which may employ any combination of existing and/or future developed cryptographic algorithms. As such, the fingerprint (212) may be a hash value, a hash code, or a digest outputted by the hash function given a data chunk (220) for input. In one embodiment of the invention, the fingerprint (212) may be pre-calculated, meaning the fingerprint (212) may have been calculated on a computing system other than the PSS (200), such as, for example, a client (222) or another PSS (224). One of ordinary skill will appreciate that fingerprints (212) may be generated and used to effect data deduplication (mentioned above) in the PSS (200). Thus, a fingerprint (212) may be substantially smaller in size than the one or more data chunks (220) with which the fingerprint (212) may be associated.

In one embodiment of the invention, a storage ID (214) may be an identifier corresponding to a storage location (i.e., a data chunk database entry (218A-218N)) wherein one or more associated data chunks (220) are stored. The storage ID (214) may be expressed by a string of characters (e.g., letters, numbers, symbols, etc.) that uniquely identifies the aforementioned storage location, thereby distinguishing the storage location from other storage locations on the PSS (200). In one embodiment of the invention, the storage ID (214) may be a binary address assigned to a starting byte in memory or persistent storage at (or extending from) which the one or more data chunks (220) may be stored. In another embodiment of the invention, the storage ID (214) may be generated, by the PSS kernel (not shown), using any existing or future developed globally unique or universally unique identifier generation techniques. By way of an example, a storage ID (214) may be an alphanumeric tag, or may be a N-bit integer (where N>0) expressed in hexadecimal notation.

In one embodiment of the invention, the data chunk database (216) may be a repository that maintains one or more data chunk database entries (218A-218N). Each data chunk database entry (218A-218N) may store a mapping relating a storage ID (214) to one or more data chunks (220). Furthermore, the data chunk database (216) may be programmed by the PSS kernel (not shown) based on the storage of data chunks (220) throughout the data deduplication process.

In one embodiment of the invention, a data chunk (220) may be a fragment or a partition of an original backup stream (i.e., a typically large volume of data submitted for storage). Further, a data chunk (220) may be a unique byte pattern that may be identified repeatedly (i.e., two or more times) throughout the original backup stream. In one embodiment of the invention, the size of each data chunk (220), otherwise recognized as the deduplication granularity and measured in kilobytes (KB) or megabytes (MB), may be determined by default or inputted parameters set in the data deduplication process.

Figure 3A:
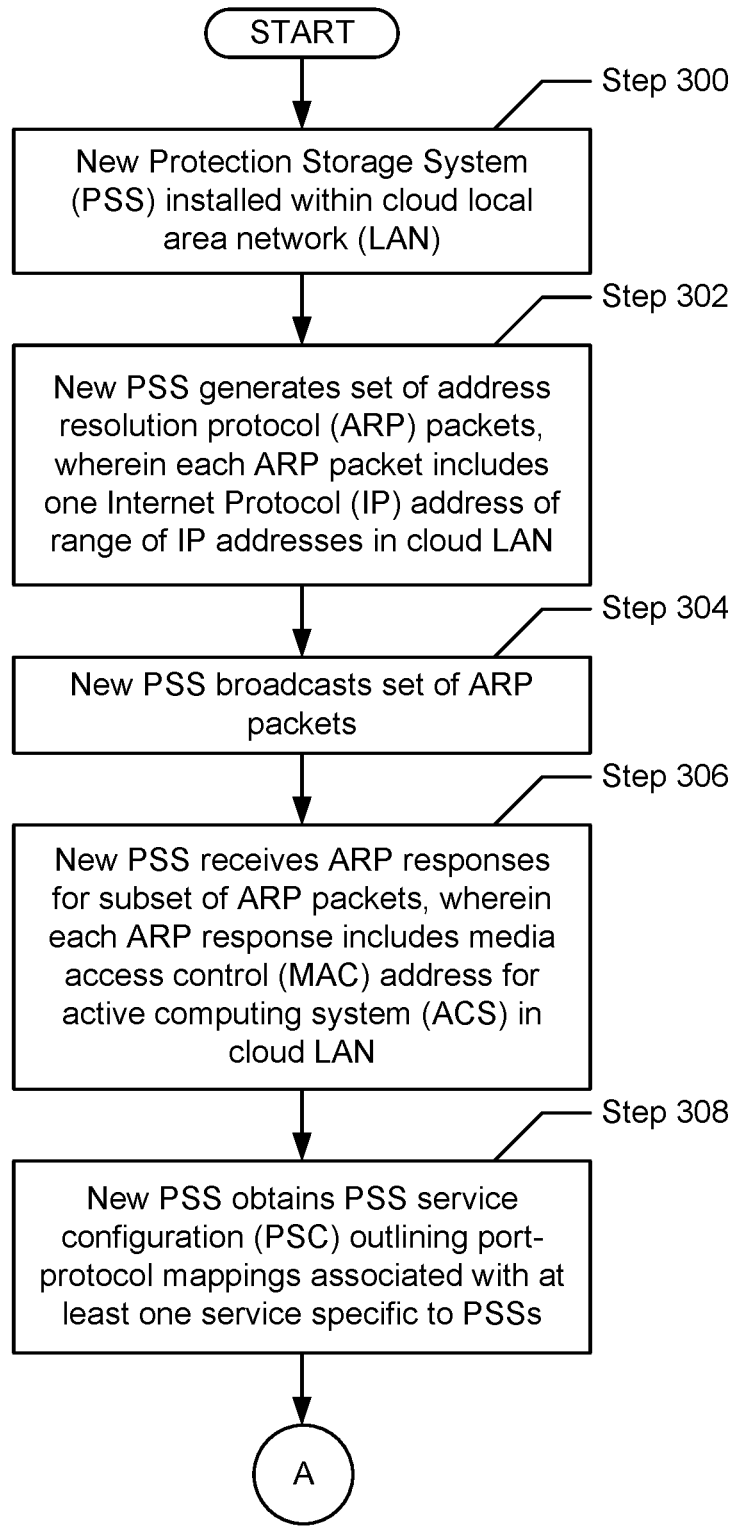
FIGS. 3A and 3B show flowcharts describing a method for discovering protection storage systems on a cloud local area network in accordance with one or more embodiments of the invention.
Figure 3B:
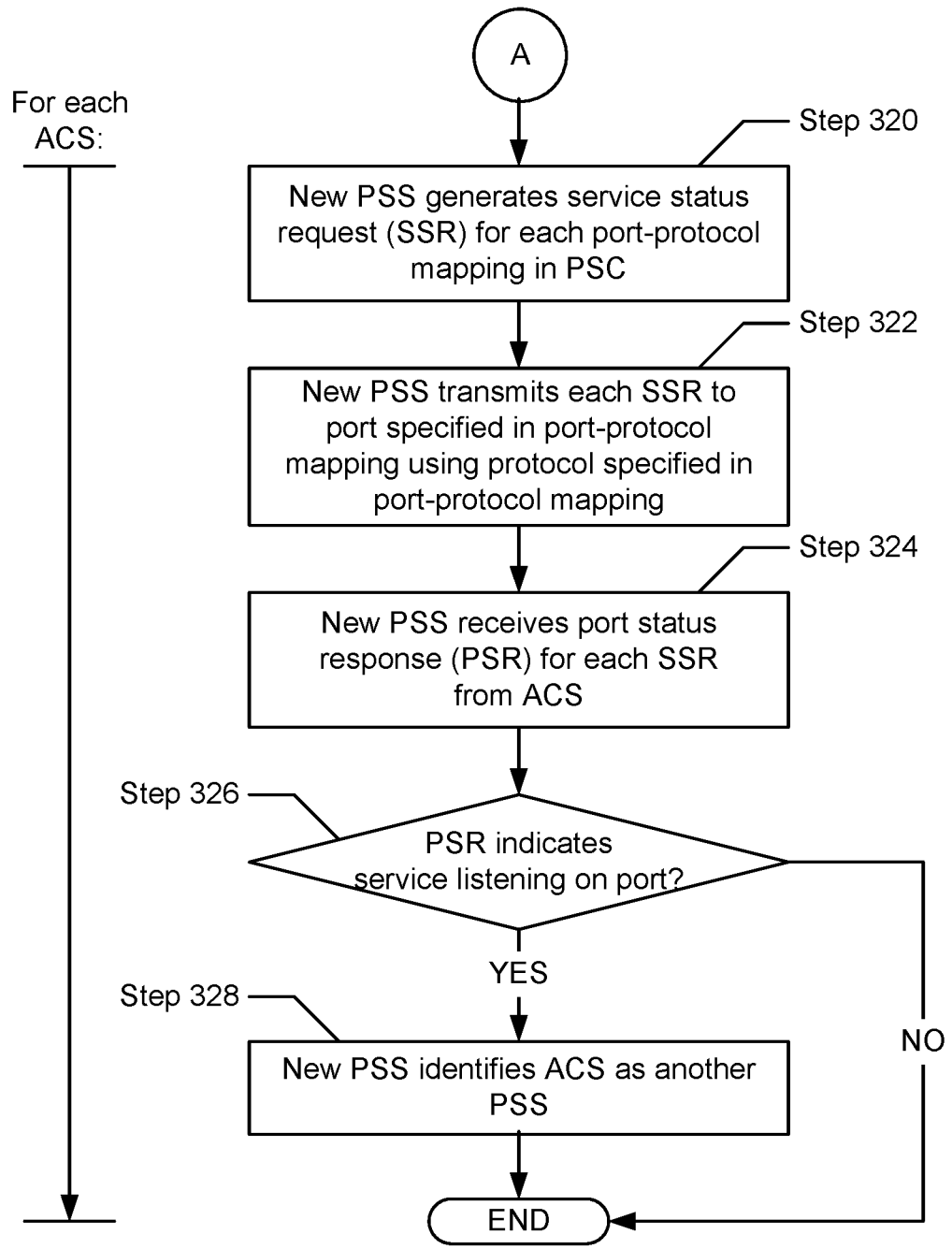

FIGS. 3A and 3B show flowcharts describing a method for discovering protection storage systems (PSSs) on a cloud local area network (LAN) in accordance with one or more embodiments of the invention. While the various steps in the flowcharts are presented and described sequentially, one of ordinary skill will appreciate that some or all steps may be executed in different orders, may be combined or omitted, and some or all steps may be executed in parallel. In one embodiment of the invention, the steps shown in FIGS. 3A and 3B may be performed in parallel with any other steps shown in FIGS. 4A-6 without departing from the scope of the invention.

Turning to FIG. 3A, in Step 300, a new PSS is installed on the cloud LAN (see e.g., FIG. 1). In one embodiment of the invention, the new PSS may be installed to supplement existing PSSs towards providing additional computer storage resources. In another embodiment of the invention, the new PSS may be installed to replace an existing PSS that: (i) may have malfunctioned or experienced failover; or (ii) may be undergoing scheduled maintenance. In one embodiment of the invention, installing the new PSS may entail operatively connecting the new PSS to the cloud LAN, followed by initializing or activating the new PSS.

In Step 302, after installation into the cloud LAN, the new PSS (to discover other PSSs on the cloud LAN) generates a set of address resolution protocol (ARP) packets. In one embodiment of the invention, each ARP packet in the set of ARP packets includes a different IP address of a range of IP addresses (excluding the IP address associated with the new PSS) designated to computing systems on the cloud LAN. The new PSS may obtain the aforementioned range of IP addresses from, for example, a memory address in random access memory (RAM) or a storage location in persistent storage residing on the new PSS, wherein the range of IP addresses may have been stored onboard the new PSS prior to its deployment/installation into the cloud LAN.

In Step 304, after generating the ARP packets, the new PSS broadcasts the set of ARP packets throughout the cloud LAN. In one embodiment of the invention, each ARP packet may be broadcasted sequentially. In Step 306, the new PSS receives a set of ARP responses back, from a set of computing systems on the cloud LAN, in response to a subset of the ARP packets (broadcasted in Step 304). In one embodiment of the invention, each ARP response of the set of ARP responses may be indicative of which computing systems on the cloud LAN are active or alive (i.e., defined herein as an active computing system (ACS)). Further, each ARP response may include a MAC address associated with an ACS, which is also associated with the IP address enclosed in the corresponding ARP packet for which the ARP response addresses.

In Step 308, after determining which computing systems on the cloud LAN are ACSs, the new PSS obtains a PSS service configuration (PSC). In one embodiment of the invention, the PSC may be obtained from, for example, a memory address in random access memory (RAM) or a storage location in persistent storage residing on the new PSS, wherein the PSC may have been stored onboard the new PSS prior to its deployment/installation into the cloud LAN. Further, the PSC may outline port-protocol mappings associated with at least one service specific to (i.e., characteristic to operations performed by) PSSs. For example, one service specific to PSSs may implement the fingerprint querying functionality (mentioned above with respect to FIG. 2) of PSSs. By way of another example, another service specific to PSSs may implement the transfer of data chunks between PSSs. In one embodiment of the invention, a port-protocol mapping may subsequently include: (i) a port number associated with a network port on a computing system through which a PSS specific service operates; and (ii) a network protocol (e.g., transmission control protocol (TCP), user data protocol (UDP), secure sockets layer (SSL) protocol, etc.) by which information passed by the PSS specific service between PSSs is conformed.

Turning to FIG. 3B, the remaining steps (i.e., Steps 320 through 328) may be iterated for each ACS identified in Step 306. In Step 320, the new PSS generates a service status request (SSR) for each port-protocol mapping specified in the PSC. In one embodiment of the invention, a SSR may be a probe for determining whether the PSS specific service associated with the port-protocol mapping is available on the ACS. In Step 322, after generating a set of SSRs, the new PSS transmits each SSR to the ACS using at least an IP address associated with the ACS (obtained by way of an ARP response in Step 306). In one embodiment of the invention, each SSR may be transmitted using the network protocol and addressed to the network port (on the ACS) specified in the port-protocol mapping for a PSS specific service.

In Step 324, the new PSS receives a set of port status responses (PSRs). In one embodiment of the invention, the set of PSRs may be received from a subset of the ACSs to which SSRs were transmitted. The set of PSRs may include: (i) replies from ACSs indicating that a PSS specific service is listening on the port number, and using the network protocol, to which a corresponding SSR was sent; and (ii) replies from ACSs indicating that the port on the ACS associated with the port number is closed or any subsequent connections to the port number will be denied.

In Step 326, a determination is made as to whether a received PSR indicates that the ACS (to which at least one SSR was sent) implements at least one service characteristic of a PSS. If it is determined that the received PSR is representative of a reply indicating that a PSS specific service is listening on the port number, and using the network protocol, specified in the corresponding transmitted SSR, then the process proceeds to Step 328. On the other hand, if it is determined that the received PSR is alternatively representative of a reply indicating that the port number on the ACS specified in the corresponding transmitted SSR is closed, or that future connections to the port number will be denied, then the process ends (i.e., the ACS, in this case, is not a PSS). In Step 328, after determining (in Step 326) that a PSS specific service is listening on the port number, and using the network protocol, specified by the transmitted SSR, the new PSS subsequently identifies the ACS (from which the PSR was received) as another PSS on the cloud LAN. From here, the process ends.

Figure 4A:
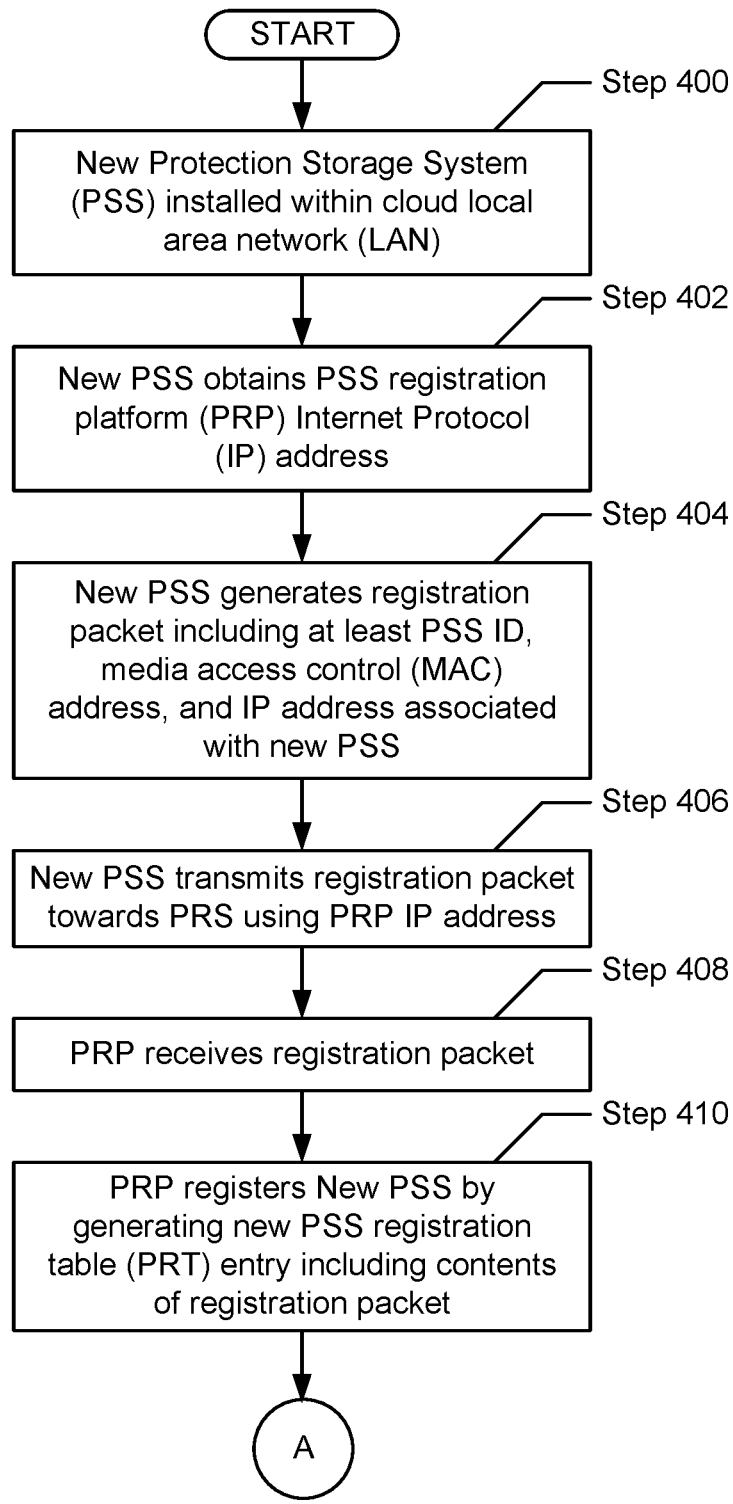
FIGS. 4A and 4B show flowcharts describing a method for discovering protection storage systems on a cloud local area network in accordance with one or more embodiments of the invention.
Figure 4B:
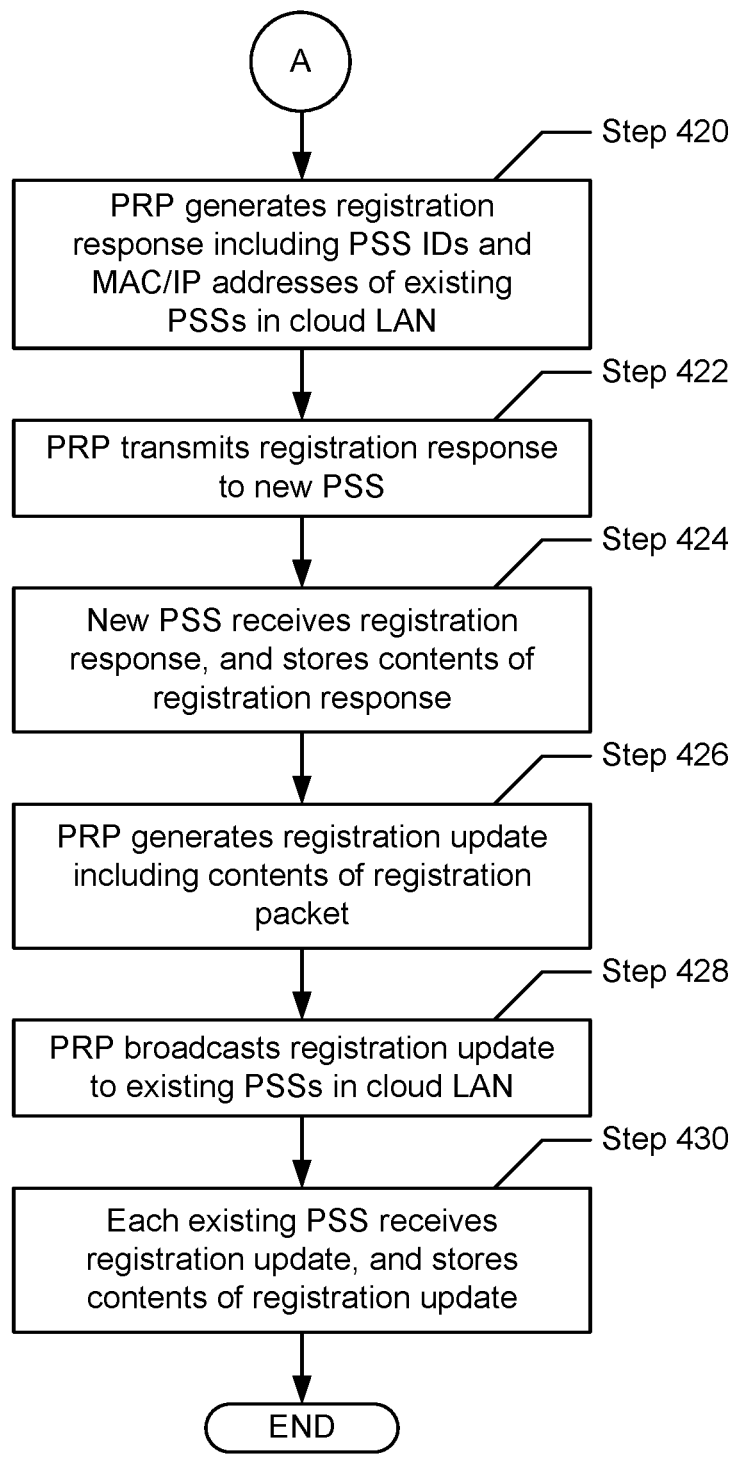

FIGS. 4A and 4B show flowcharts describing a method for discovering protection storage systems (PSSs) on a cloud local area network (LAN) in accordance with one or more embodiments of the invention. While the various steps in the flowcharts are presented and described sequentially, one of ordinary skill will appreciate that some or all steps may be executed in different orders, may be combined or omitted, and some or all steps may be executed in parallel. In one embodiment of the invention, the steps shown in FIGS. 4A and 4B may be performed in parallel with any other steps shown in FIGS. 3A-3B and/or FIGS. 5A-6 without departing from the scope of the invention.

Turning to FIG. 4A, in Step 400, a new PSS is installed on the cloud LAN (see e.g., FIG. 1). In one embodiment of the invention, the new PSS may be installed to supplement existing PSSs towards providing additional computer storage resources. In another embodiment of the invention, the new PSS may be installed to replace an existing PSS that: (i) may have malfunctioned or experienced failover; or (ii) may be undergoing scheduled maintenance. In one embodiment of the invention, installing the new PSS may entail operatively connecting the new PSS to the cloud LAN, followed by initializing or activating the new PSS.

In Step 402, after installation into the cloud LAN, the new PSS obtains a PSS registration platform (PRP) IP address. In one embodiment of the invention, the new PSS may obtain the aforementioned PRP IP address from, for example, a memory address in random access memory (RAM) or a storage location in persistent storage residing on the new PSS, where the PRP IP address may have been stored onboard the new PSS prior to its deployment/installation into the cloud LAN.

In Step 404, the new PSS generates a registration packet. In one embodiment of the invention, the registration packet may include, but is not limited to: (i) a PSS ID associated with the new PSS; (ii) a MAC address associated with the new PSS; and (iii) an IP address associated with the new PSS. In one embodiment of the invention, the PSS ID may be a string of characters (e.g., letters, numbers, symbols, etc.) that is used to identify a PSS. The PSS ID may be provided to the PSS prior to its deployment/installation on the cloud LAN. Further, the PSS ID may be a unique identifier that distinguishes the PSS (e.g., the new PSS) from other PSSs (e.g., the existing PSSs) on the cloud LAN. By way of an example, a PSS ID may be an alphanumeric tag, or may be a N-bit integer (where N>0) expressed in hexadecimal notation, which may be provided by an administrator.

In Step 406, the new PSS transmits the registration packet (generated in Step 404). In one embodiment of the invention, the registration packet may be transmitted towards a PRP associated with the PRP IP address (obtained in Step 402). As described above, a PRP may be a hardware and/or software implemented service that provides the centralized management of the PSSs.

In Step 408, the PRP receives the registration packet. Thereafter, in Step 410, based on at least a portion of the information enclosed in the received registration packet, the PRP registers the new PSS. In one embodiment of the invention, registering the new PSS may entail: (i) extracting at least the PSS ID, MAC address, and IP address associated with the new PSS from the registration packet; and (ii) generating a new table entry in a PSS registration table (PRT) stored on the PRP, wherein the new table entry includes at least the extracted PSS ID, MAC address, and IP address associated with the new PSS.

Turning to FIG. 4B, in Step 420, after registering the new PSS, the PRP generates a registration response. In one embodiment of the invention, the registration response may include information specified in a set of existing table entries in the PRT. Specifically, the registration response may include at least a PSS ID, a MAC address, and an IP address associated with each existing (i.e., previously registered) PSS of a set of existing PSSs on the cloud LAN. In Step 422, the PRP transmits the registration response (generated in Step 420) towards the new PSS.

In Step 424, the new PSS receives the registration response transmitted by the PRP. In one embodiment of the invention, upon receiving the registration response, the new PSS may subsequently store at least: (i) the IP address associated with each existing PSS (included in the registration response) in a routing information base (RIB) stored on the new PSS; and (ii) the MAC address associated with each existing PSS (also included in the registration response) in a forwarding information base (FIB) stored on the new PSS.

In Step 426, after transmitting the registration response to the new PSS, the PRP proceeds to generate a set of registration updates. In one embodiment of the invention, each registration update of the set of registration updates may include information specified in the new table entry in the PRT (generated in Step 410). More specifically, each registration update may include at least a PSS ID, a MAC address, and an IP address associated with the new PSS.

In Step 428, the PRP then broadcasts the set of registration updates towards the set of existing PSSs on the cloud LAN. In one embodiment of the invention, each registration update may be directed to one IP address on the cloud LAN, where the one IP address may be associated with an existing PSS. Further, in one embodiment of the invention, the IP addresses to which the set of registration updates may be directed may be obtained from the set of existing table entries in the PRT stored on the PRP. In Step 430, each existing PSS on the cloud LAN receives a respective registration update of the set of registration updates transmitted by the PRP. Thereafter, in one embodiment of the invention, each existing PSS may subsequently update at least: (i) a RIB stored on the existing PSS to include the IP address associated with the new PSS (included in the registration update); and (ii) a FIB stored on the existing PSS to include the MAC address associated with the new PSS (also included in the registration update). From here, the process ends.

Figure 5A:
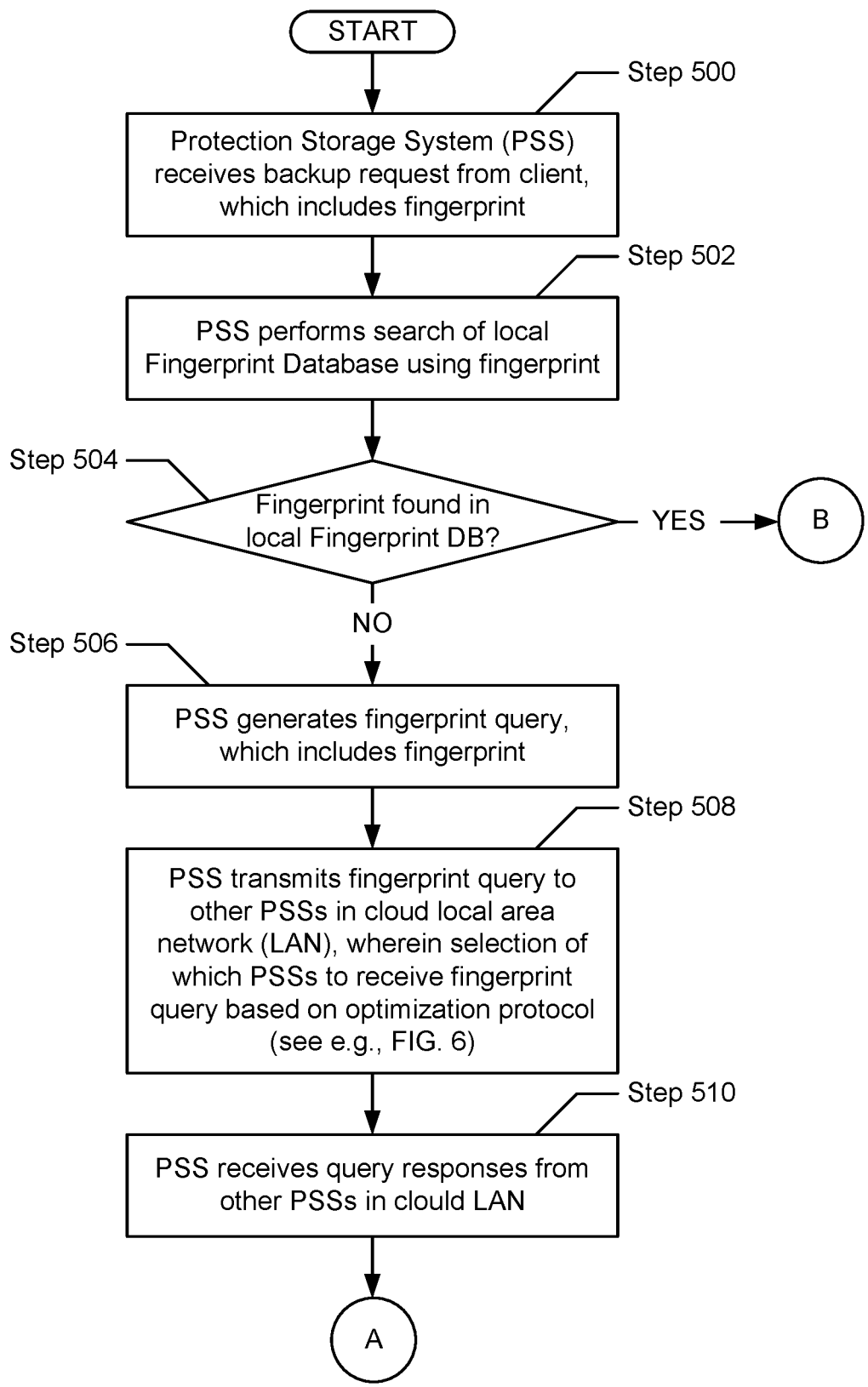
FIGS. 5A-5C show flowcharts describing a method for sharing fingerprints and data chunks amongst protection storage systems on a cloud local area network in accordance with one or more embodiments of the invention.
Figure 5B:
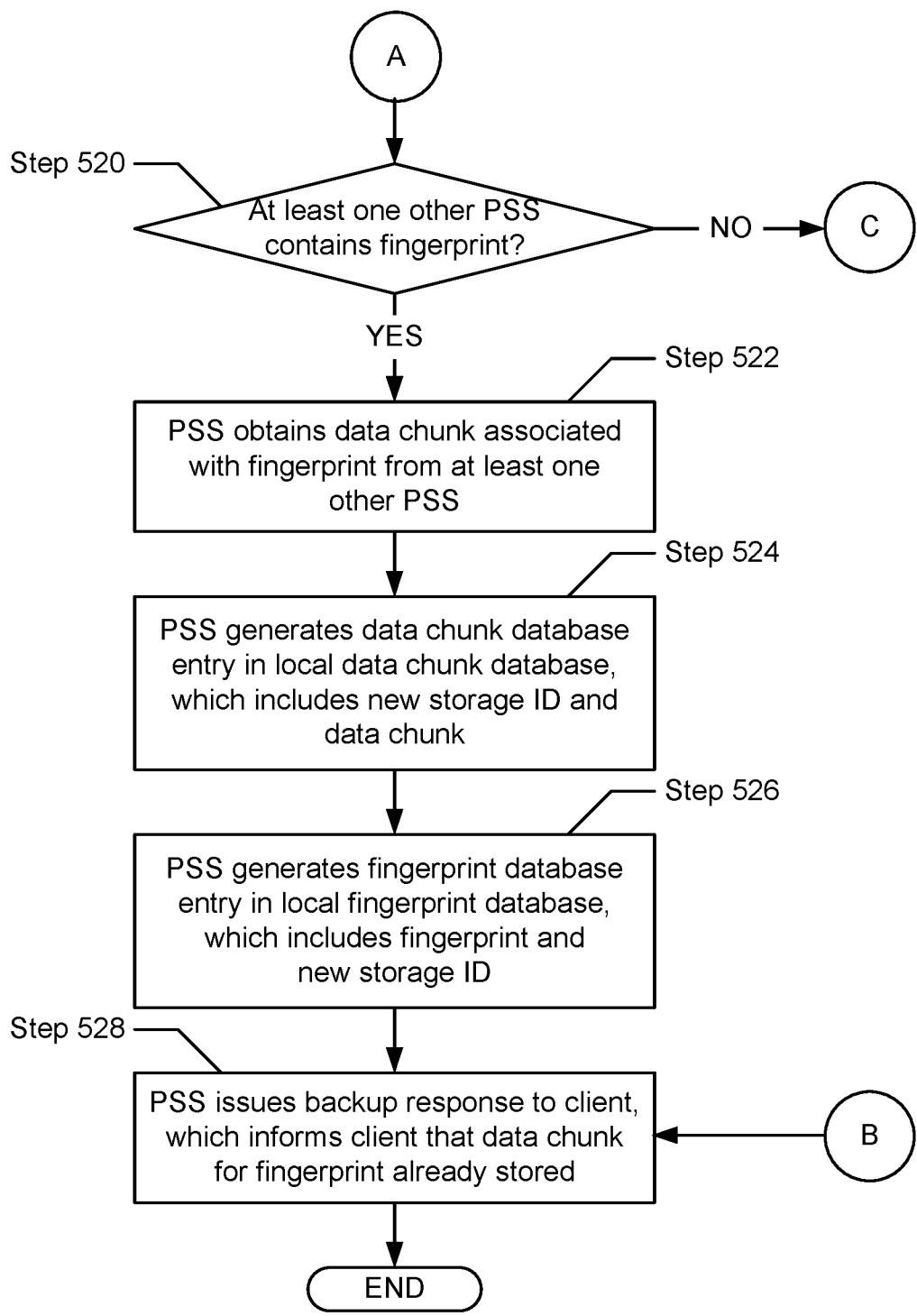
Figure 5C:
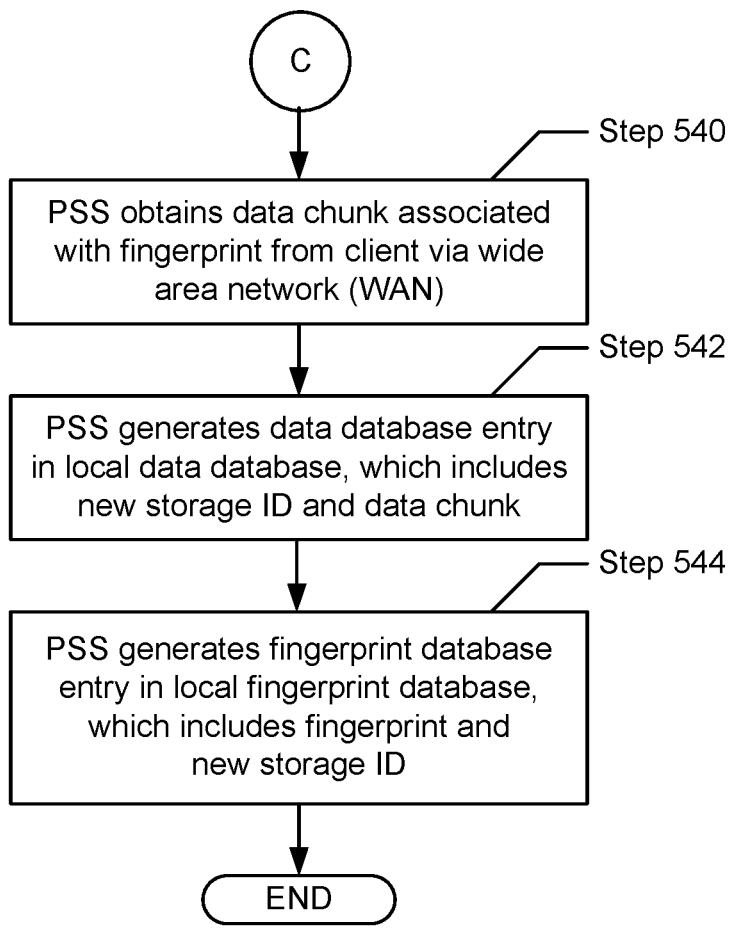

FIGS. 5A-5C show flowcharts describing a method for sharing fingerprints and data chunks amongst protection storage systems (PSSs) on a cloud local area network (LAN) in accordance with one or more embodiments of the invention. While the various steps in the flowcharts are presented and described sequentially, one of ordinary skill will appreciate that some or all steps may be executed in different orders, may be combined or omitted, and some or all steps may be executed in parallel. In one embodiment of the invention, the steps shown in FIGS. 5A-5C may be performed in parallel with any other steps shown in FIGS. 3A-4B and/or FIG. 6 without departing from the scope of the invention.

Turning to FIG. 5A, in Step 500, a PSS receives a backup request from a client. In one embodiment of the invention, the backup request may be transmitted from the client to the PSS through a WAN. Further, the backup request may include a fingerprint, or a digital signature that uniquely identifies a data chunk. In one embodiment of the invention, the purpose of the backup request may be to inquire whether the PSS has the data chunk(s) associated with the fingerprint stored already or whether the client needs to upload the associated data chunk(s) through the WAN to the PSS for storage.

In Step 502, the PSS performs a search or lookup on a fingerprint database using the fingerprint. In one embodiment of the invention, the search/lookup may entail an attempt at identifying a database entry in the fingerprint database (see e.g., FIG. 2) that includes at least the fingerprint (received in Step 500). Further, the fingerprint database may be the local fingerprint database residing on the PSS, which may catalog the fingerprints associated with the data chunks that may be stored locally on the PSS.

In Step 504, a determination is made as to whether the received fingerprint is stored in the local fingerprint database. If it is determined, based on the search/lookup, that the received fingerprint is not stored in the local fingerprint database (i.e., no database entry in the local fingerprint database includes the received fingerprint), then the process proceeds to Step 506. On the other hand, if it is alternatively determined, based on the search/lookup, that the received fingerprint is stored in the local fingerprint database (i.e., one database entry in the local fingerprint database includes the received fingerprint), then the process proceeds to Step 528 (see e.g., FIG. 5B).

In Step 506, after determining (in Step 504) that the received fingerprint is not stored in the local fingerprint database, the PSS generates a set of fingerprint queries. In one embodiment of the invention, each fingerprint query may include the fingerprint (received by way of the backup request in Step 500). Further, the purpose of a fingerprint query may be to inquire whether other PSSs on the cloud LAN have the fingerprint stored in their respective local fingerprint databases.

In Step 508, the PSS transmits the set of fingerprint queries (generated in Step 506). In one embodiment of the invention, the set of fingerprint queries may be transmitted from the PSS, through the cloud LAN, to a set of other PSSs. Further, the set of other PSSs may, in one embodiment of the invention, be a subset of all other PSSs on the cloud LAN. In one embodiment of the invention, selection of which one or more other PSSs of all other PSSs to receive a fingerprint query may be determined/identified based on an optimization protocol, an exemplification of which is described in further detail below with respect to FIGS. 6A and 6B. In another embodiment of the invention, all other PSSs on the cloud LAN may be selected to receive a fingerprint query.

In Step 510, the PSS receives a set of query responses from the other PSSs on the cloud LAN (selected to receive a fingerprint query in Step 508). In one embodiment of the invention, each query response may be a reply to a fingerprint query by a selected other PSS. Accordingly, each query response may inform the PSS: (i) that the respective other PSS (which transmitted the query response) has determined, based on a search/lookup performed on its respective local fingerprint database, that the fingerprint (enclosed in the fingerprint query) is stored on the other PSS; or (ii) that the respective other PSS has determined, based on a search/lookup performed on its respective local fingerprint database, that the fingerprint is not stored on the other PSS.

Turning to FIG. 5B, in Step 520, a determination is made as to whether at one selected other PSS has cataloged the fingerprint (specified in the backup request received in Step 500). If it is determined, based on a review of the set of query responses (received in Step 510), that at least one selected other PSS does have the fingerprint stored, then the process proceeds to Step 522. On the other hand, if it is alternatively determined, based on a review of the set of query responses, that none of the selected other PSSs have the fingerprint stored, then the process proceeds to Step 540 (see e.g., FIG. 5C).

In Step 522, after determining (in Step 520), that at least one selected other PSS is storing the fingerprint, the PSS obtains the data chunk associated with the fingerprint from one of the at least one selected other PSS. In one embodiment of the invention, selection of which one of the at least one selected other PSS from which to obtain the data chunk may be determined: (i) at random; (ii) based on a path cost (i.e., proximity) a selected other PSS is to the PSS; or (iii) based on any other selection process without departing from the scope of the invention. Further, the selected other PSS may, in order to provide the data chunk to the PSS: (i) receive a data chunk request for the fingerprint from the PSS; and in response to receiving the data chunk request: (ii) identify the database entry in its local fingerprint database containing the fingerprint; (iii) obtain the storage ID also specified in the identified fingerprint database entry; (iv) identify the database entry in its local data chunk database (see e.g., FIG. 2) to which the storage ID corresponds; (v) obtain the data chunk stored in the identified data chunk database entry; (vi) generate a data chunk response including the obtained data chunk; and (vii) transmit the data chunk response, through the cloud LAN, to the PSS.

In Step 524, after obtaining the data chunk (in Step 522) from the selected other PSS, the PSS updates its local data chunk database. In one embodiment of the invention, updating the local data chunk database may entail generating a new database entry in the local data chunk database. The new database entry may include the data chunk (obtained in Step 522) and a new storage ID identifying the new data chunk database entry. In one embodiment of the invention, the new storage ID may be a reference to the location in persistent storage on the PSS wherein the data chunk is stored.

In Step 526, the PSS subsequently updates its local fingerprint database. In one embodiment of the invention, updating the local fingerprint database may entail generating a new database entry in the local fingerprint database. The new database entry may include the fingerprint (received in Step 500) and the new storage ID (specified in Step 524). Thereafter, in Step 528, the PSS issues a backup response to the client. In one embodiment of the invention, issuing of the backup response may be performed after the updating of a local fingerprint database on the PSS as described in Step 526. In another embodiment of the invention, issuing of the backup response may result from determining (in Step 504) that the fingerprint is already stored in the local fingerprint database on the PSS. Moreover, in one embodiment of the invention, the backup response may inform the client that the data chunk associated with the fingerprint (received by way of the backup request from the client in Step 500) is already stored, and that uploading of the data chunk from the client, through the WAN, is not necessary. From here, the process ends.

Turning to FIG. 5C, in Step 540, after determining (in Step 520) that none of the other PSSs is storing the fingerprint (specified in a fingerprint query transmitted by the PSS in Step 508), the PSS obtains the data chunk associated with the fingerprint from the client. In one embodiment of the invention, in order to obtain the data chunk from the client, the PSS may: (i) issue (i.e., generate and transmit) a backup response to the client, where the backup response informs the client that the fingerprint, and thus, an associated data chunk is not already stored; and (ii) receive, through the WAN, and in response to the backup response, a data transfer including the data chunk from the client.

In Step 542, after obtaining the data chunk from the client, the PSS updates its local data chunk database. In one embodiment of the invention, updating the local data chunk database may entail generating a new database entry in the local data chunk database. The new database entry may include the data chunk (obtained in Step 540) and a new storage ID identifying the new data chunk database entry. In one embodiment of the invention, the new storage ID may be a reference to the location in persistent storage on the PSS wherein the data chunk is stored. In Step 544, the PSS subsequently updates its local fingerprint database. In one embodiment of the invention, updating the local fingerprint database may entail generating a new database entry in the local fingerprint database. The new database entry may include the fingerprint (received in Step 500) and the new storage ID (specified in Step 542).

Figure 6A:
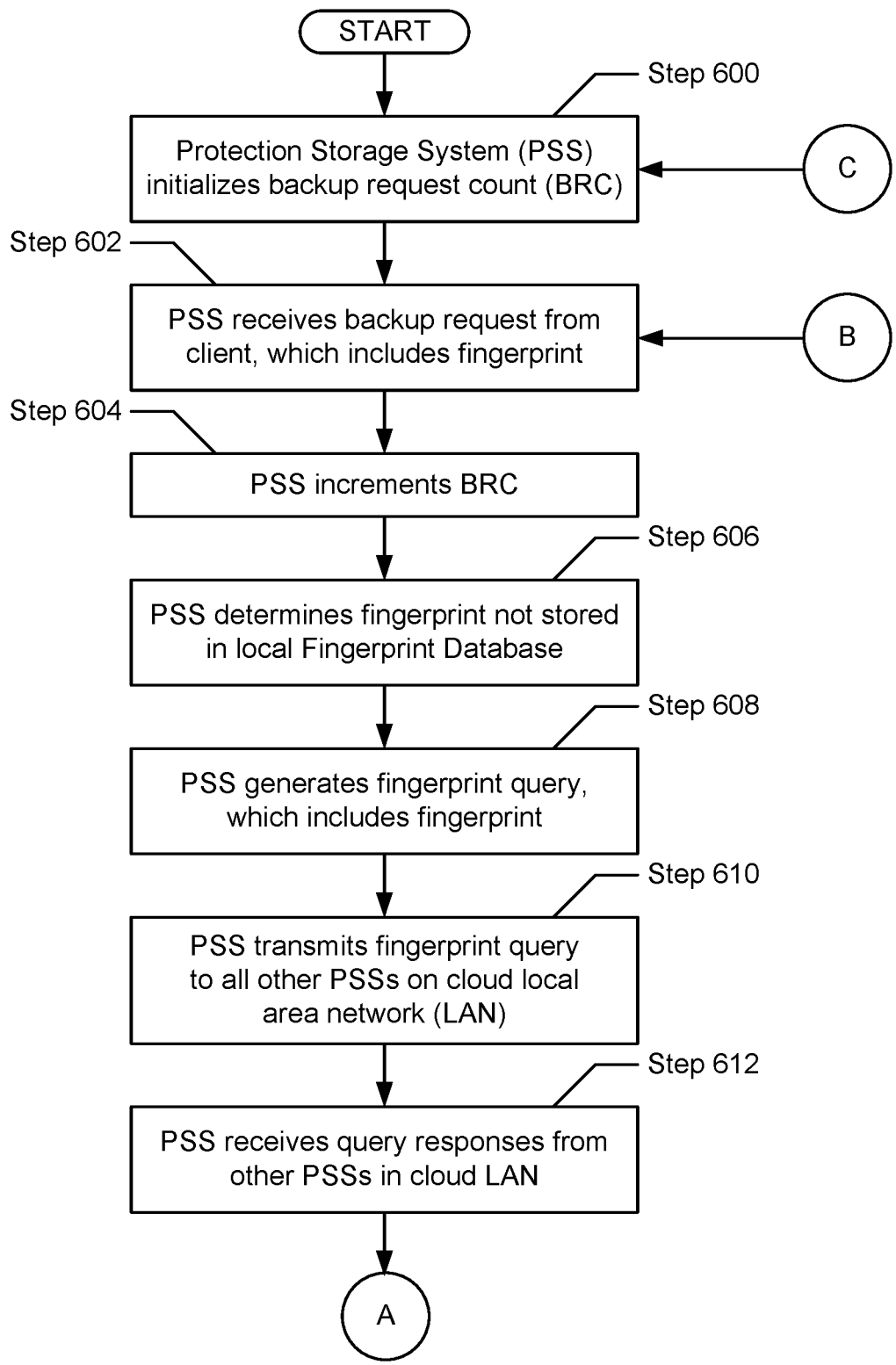
FIGS. 6A and 6B show flowcharts describing a method for selecting protection storage systems on a cloud local area network as query recipients in accordance with one or more embodiments of the invention.
Figure 6B:
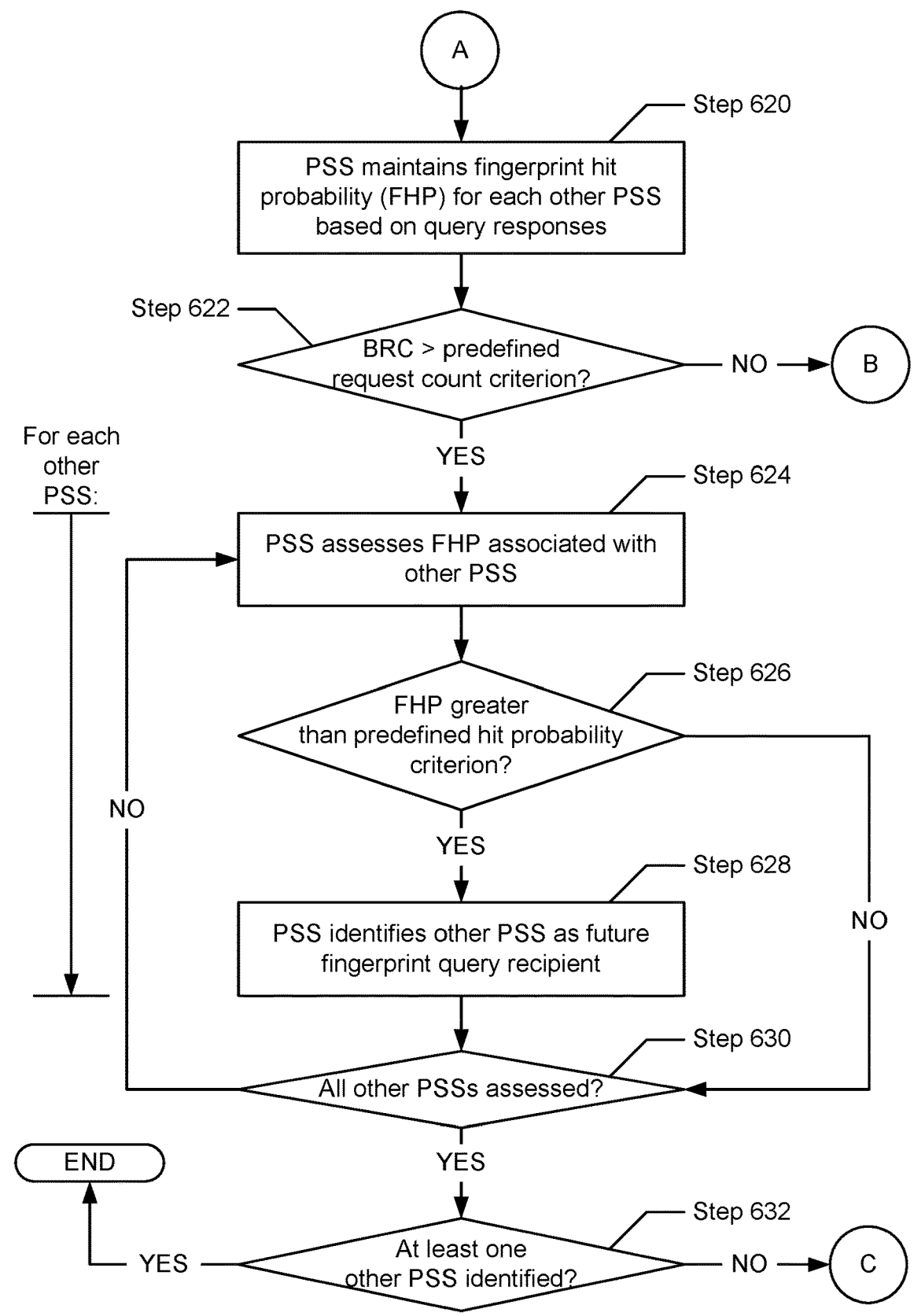

FIGS. 6A and 6B show flowcharts describing a method for selecting protection storage systems (PSSs) on a cloud local area network (LAN) as query recipients in accordance with one or more embodiments of the invention. While the various steps in the flowchart are presented and described sequentially, one of ordinary skill will appreciate that some or all steps may be executed in different orders, may be combined or omitted, and some or all steps may be executed in parallel. In one embodiment of the invention, the steps shown in FIG. 6 may be performed in parallel with any other steps shown in FIGS. 3A-5C without departing from the scope of the invention.

Turning to FIG. 6A, in Step 600, a PSS initializes a backup request count (BRC). In one embodiment of the invention, the BRC may be implemented as a counter or a register of an integrated circuit (i.e., computer processor) residing on the PSS. Further, initializing the BRC may entail setting an initial value stored in the BRC to zero.

In Step 602, the PSS receives a backup request from a client. In one embodiment of the invention, the backup request includes a fingerprint. The fingerprint may be a digital signature that uniquely identifies a data chunk. In Step 604, in receiving the backup request, the PSS increments the BRC. Specifically, in one embodiment of the invention, the PSS increments the stored value in the BRC by one to account for the received backup request.

In Step 606, the PSS determines that the fingerprint (received in Step 602) is not stored in a local fingerprint database residing on the PSS. In one embodiment of the invention, arriving at the determination may entail the PSS performing a search/lookup of the local fingerprint database using the fingerprint and finding not one database entry in the local fingerprint database that specifies the fingerprint.

In Step 608, based on the determination of Step 606, the PSS generates a set of fingerprint queries. In one embodiment of the invention, each fingerprint query of the set of fingerprint queries includes the fingerprint. In Step 610, the PSS transmits the set of fingerprint queries towards a set of all other PSSs on the cloud LAN. Specifically, in one embodiment of the invention, the PSS transmits each different fingerprint query (of the set of fingerprint queries) to a different other PSS (of the set of all other PSSs). Further, in Step 612, the PSS subsequently receives a set of query responses from the set of all other PSSs on the cloud LAN. In one embodiment of the invention, each query response may be a reply to the fingerprint query by another PSS. Accordingly, each query response may inform the PSS: (i)

that the respective other PSS (which transmitted the query response) has determined, based on a search/lookup performed on its respective local fingerprint database, that the fingerprint (enclosed in the fingerprint query) is stored on the other PSS; or (ii) that the respective other PSS has determined, based on a search/lookup performed on its respective local fingerprint database, that the fingerprint is not stored on the other PSS.

Turning to FIG. 6B, in Step 620, the PSS maintains fingerprint hit statistics for each other PSS based on the set of request responses (received in Step 612). Specifically, in one embodiment of the invention, the PSS may maintain a fingerprint hit probability (FHP) for each other PSS. For each other PSS, the associated FHP may refer to the probability that the other PSS contains the fingerprint, and by association, the data chunk being sought. Further, a FHP may be calculated at least in part through the recorded ratio of query responses, submitted by one other PSS, that indicated a fingerprint is stored thereon versus query responses that indicated that the fingerprint is not stored thereon.

In Step 622, a determination is made as to whether the stored value in the BRC exceeds a predefined count criterion. In one embodiment of the invention, the predefined count criterion may be a predetermined value specifying a threshold number (i.e., a large enough sample population) of backup requests to be received and recorded, which when reached, leads to the execution of subsequent steps towards identifying/selecting which subset of other PSSs may be recipients of future fingerprint queries. By way of an example, the predefined count criterion may specify the threshold number of backup requests to equal ten-thousand (10,000). Accordingly, if it is determined that the BRC exceeds the predefined count criterion, the process proceeds to Step 624. On the other hand, if it is alternatively determined that the BRC falls short of the predefined count criterion, the process proceeds to Step 602, wherein the PSS receives another backup request.

In Step 624, after determining (in Step 622) that the BRC exceeds the predefined count criterion, the PSS assesses the FHP associated with one other PSS (of the set of all other PSSs). In one embodiment of the invention, assessment of the FHP may entail comparing the FHP to a predefined hit probability criterion. The predefined hit probability criterion may be a predetermined value specifying a threshold probability (i.e., that a sought fingerprint and data chunk is stored on another PSS), which when reached, identifies or selects the one other PSS as a recipient of future fingerprint queries. By way of an example, the predefined hit probability criterion may specify the threshold probability, expressed as a percentage, to equal eighty percent (80%).

In Step 626, a determination is made as to whether the FHP associated with the one other PSS meets the predefined hit probability criterion. If it is determined that the FHP meets the predefined hit probability criterion, the process proceeds to Step 628. On the other hand, if it is alternatively determined that the FHP fails to meet the predefined hit probability criterion, the process proceeds to Step 630.

In Step 628, after determining (in Step 626) that the FHP associated with the one other PSS meets the predefined hit probability criterion, the PSS identifies the one other PSS as a recipient of any future fingerprint queries. In one embodiment of the invention, distinguishing of the one other PSS from other PSSs in the set of all other PSSs may entail storing a unique PSS ID associated with the one other PSS in a reserved memory location or register residing on the PSS.

In Step 630, a determination is made as to whether the FHP for each other PSS of the set of all other PSSs have been assessed. In one embodiment of the invention, arrival at this determination may have resulted after the identifying of one other PSS as a recipient of any future fingerprint queries (as per Step 628). In another embodiment of the invention, arrival at this determination may have resulted after determining (in Step 626) that the FHP associated with one other PSS fails to meet the predefined hit probability criterion. Moreover, if it is determined that the FHPs for all other PSSs have been assessed, then the process proceeds to Step 632. On the other hand, if it is alternatively determined that at least one remaining FHP (associated with at least one remaining other PSS) has yet to undergo assessment, the process proceeds to Step 624, wherein another FHP associated with another one other PSS of the set of all PSSs undergoes assessment.

In Step 632, after determining (in Step 630) that the associated FHPs for all other PSSs have undergone assessment, another determination is made as to whether at least one other PSS has been identified as a recipient of future fingerprint queries submitted by the PSS. In one embodiment of the invention, arrival at this determination may have resulted in the assessment of all FHPs, where at least one FHP met the predefined hit probability criterion, thus leading to the identification of at least one other PSS as a recipient of future fingerprint queries. In another embodiment of the invention, arrival at this determination may have resulted in the assessment of all FHPs, wherein none of the FHPs met the predefined hit probability criterion, thus leading to the identification of all other PSSs as non-recipients of future fingerprint queries. As such, if it is determined that at least one other PSS of the set of all other PSSs has been identified as a future fingerprint queries recipient, the process ends. On the other hand, if it is alternatively determined that none of the other PSSs of the set of all other PSSs have been identified as future fingerprint queries recipients, the process proceeds to Step 600, where the BRC is reinitialized and steps outlined in FIGS. 6A and 6B may be re-performed.

While FIGS. 6A and 6B show a method for fingerprint query recipient selection, other methods for fingerprint query recipient selection may be used without departing from the scope of the invention. For example, in one embodiment of the invention, the optimization engine (see e.g., FIG. 2) may be further configured to record the storage space size (i.e., size of the data chunk database) in each PSS allocated for storing data chunks. In this embodiment, fingerprint query recipient selection may subsequently be determined through the sorting of PSSs by their recorded storage space size, where the PSS(s) with the largest storage space size(s) for storing data chunks tend to maintain a higher probability of having the fingerprint, and thus the associated data chunk, being sought.

Figure 7:
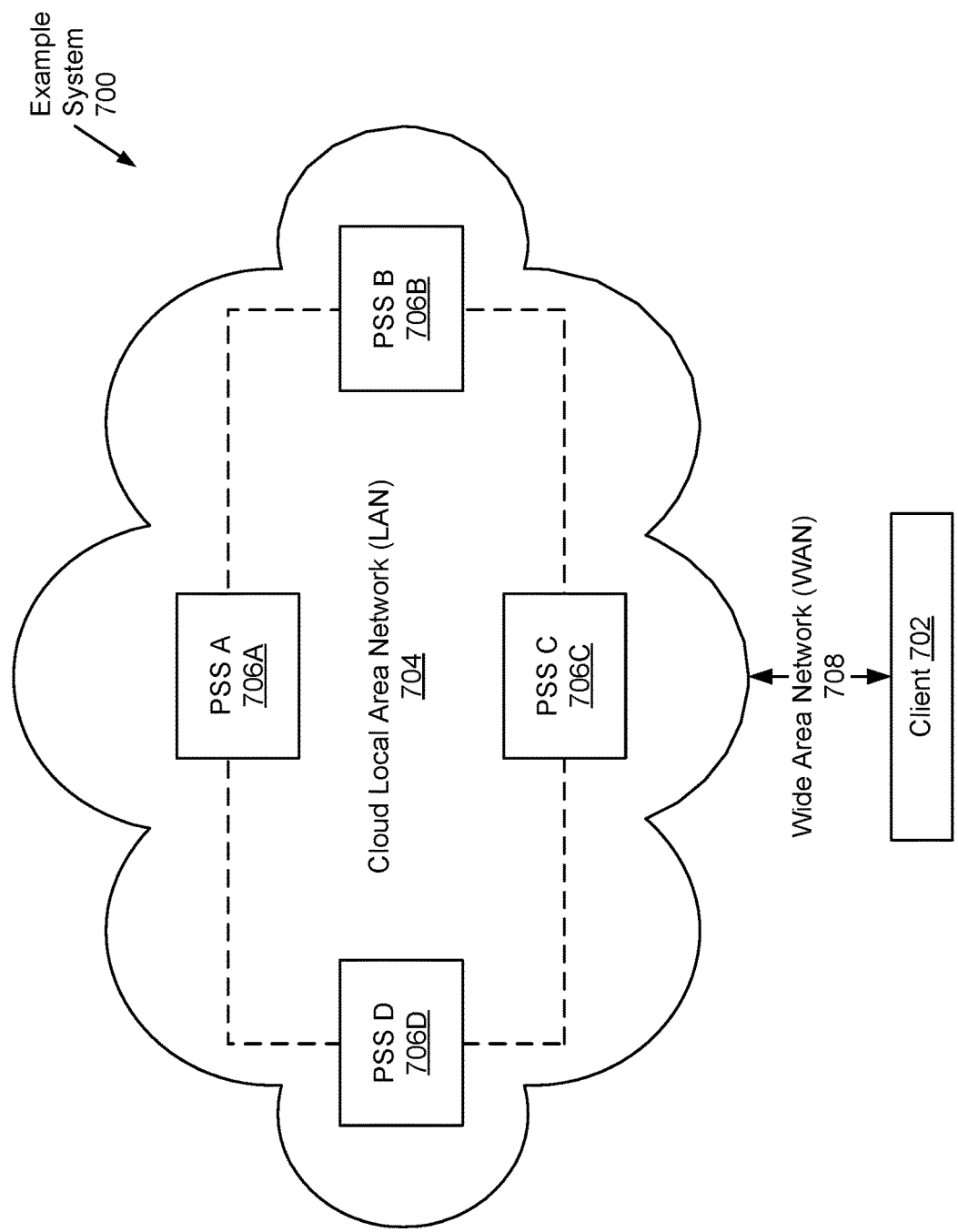
FIG. 7 shows an example system in accordance with one or more embodiments of the invention.

FIG. 7 shows an example system in accordance with one or more embodiments of the invention. The following example, presented in conjunction with components shown in FIG. 7, is for explanatory purposes only and not intended to limit the scope of the invention.

Turning to FIG. 7, the example system (700) includes a client (702) operatively connected, through a WAN (708), to a cloud LAN (704). The cloud LAN (704) subsequently includes four PSSs (706A-706D). Turning to the example, consider a scenario whereby the client submits a backup request to a PSS (706A). The backup request includes a fingerprint, and serves to inquire whether the PSS already possesses the fingerprint and, subsequently, the data chunk associated with the fingerprint. Upon receiving the backup request, the PSS searches through its local fingerprint database using the fingerprint, and determines that the fingerprint is not stored therein. Based on this determination, the PSS issues (i.e., generates and transmits) a set of fingerprint queries wherein each fingerprint query includes the fingerprint. The PSS selects two other PSSs (706B, 706C) as the recipients of the fingerprint queries based on the optimization protocol (see e.g., FIGS. 6A and 6B) applied during the processing of a set of previously received backup requests.

Thereafter, the PSS (706A) receives a query response from each of the two selected other PSSs (706B, 706C). The query response from one of the two selected other PSSs (706B) indicates that the fingerprint is not stored thereon, however, the query response from the other of the two selected other PSSs (706C) indicates that the fingerprint is indeed stored thereon. Based on the indication of the latter query response, the PSS (706A) obtains the data chunk associated with the fingerprint (which is stored on the other PSS (706C)) from the other PSS (706C) through the cloud LAN (704). Upon receiving the data chunk, the PSS (706A) updates its local data chunk database to include a new database entry containing the data chunk and a new storage ID. Then, the PSS (706A) updates its local fingerprint database to include another new database entry containing the fingerprint and the new storage ID. Finally, the PSS (706A) issues a backup response to the client (702), through the WAN (708), informing the client (702) that the fingerprint (specified in the backup request) is already stored on the PSS (706A), alongside the data chunk associated with the fingerprint. The client (702) may subsequently interpret the backup response to mean that the client (702) does not need to upload the data chunk for the fingerprint to the PSS (706A) through the WAN (708).

Embodiments of the invention may be implemented on a computing system. Any combination of mobile, desktop, server, router, switch, embedded device, or other types of hardware may be used. For example, as shown in FIG. 8, the computing system (800) may include one or more computer processors (802), non-persistent storage (804) (e.g., volatile memory, such as random access memory (RAM), cache memory), persistent storage (806) (e.g., a hard disk, an optical drive such as a compact disk (CD) drive or digital versatile disk (DVD) drive, a flash memory, etc.), a communication interface (812) (e.g., Bluetooth interface, infrared interface, network interface, optical interface, etc.), and numerous other elements and functionalities.

The computer processor(s) (802) may be an integrated circuit for processing instructions. For example, the computer processor(s) may be one or more cores or micro-cores of a processor. The computing system (800) may also include one or more input devices (810), such as a touchscreen, keyboard, mouse, microphone, touchpad, electronic pen, or any other type of input device.

The communication interface (812) may include an integrated circuit for connecting the computing system (800) to a network (not shown) (e.g., a local area network (LAN), a wide area network (WAN) such as the Internet, mobile network, or any other type of network) and/or to another device, such as another computing device.

Further, the computing system (800) may include one or more output devices (808), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (802), non-persistent storage (804), and persistent storage (806). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Embodiments of the invention provide a method and system for sharing pre-calculated fingerprints and data chunks amongst storage systems on a cloud LAN. Specifically, embodiments of the invention call upon data deduplication storage systems residing on the cloud LAN to transfer data chunks associated with fingerprints between themselves as an alternative to a client uploading the data chunks through a WAN. Data transfer through the cloud LAN may be advantageous over data transfer through a WAN because: (i) LANs tend to support higher data transfer rates (e.g., 1000 mbps), whereas WANs tend to support lower data transfer rates (e.g., 150 mbps)—using the cloud LAN thus ensures that the storage of data entails a far less time consuming operation; and (ii) data transfers through LANs tend to incur minimal, if not zero, bandwidth related costs, whereas data transfers through WANs tend to incur substantially higher bandwidth related costs (usually per gigabyte (GB) of data per month)—using the cloud LAN thus reduces storage implementation and usage costs.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for implementing data chunk transfer by a protection storage system (PSS), the method comprising:
   performing an optimization protocol by maintaining a fingerprint hit probability (FHP), for each PSS of a set of PSSs to obtain a set of FHPs, wherein the FHP is a ratio of a number of query responses indicating a fingerprint match to a number query of responses indicating no fingerprint match;
   selecting, based on the FHPs, a first subset of PSSs of the set of PSSs;
   receiving, by a first protection storage system (PSS), a first backup request from a client, wherein the first backup request comprises a first fingerprint, wherein the first fingerprint is a digital signature that uniquely identifies a first data chunk, wherein the client and the first PSS are connected via a wide area network (WAN);
   generating a first fingerprint query comprising the first fingerprint;
   transmitting the first fingerprint query to the first subset of PSSs, wherein the first PSS and the first subset of PSSs are connected via a local area network (LAN);
   obtaining, in response to the first fingerprint query and from a second PSS of the first subset of PSSs, the first data chunk; and updating, in response to obtaining the first data chunk from the second PSS, a fingerprint hit probability (FHP) associated with the second PSS,
wherein the performing of the optimization protocol further comprises:
receiving a set of backup requests from the client, wherein a cardinality of the set of backup requests meets a predefined request count criterion;
maintaining, based on the set of backup requests, the FHP for each PSS of the set of PSSs to obtain the set of FHPs; and
assessing each FHP of the set of FHPs to select the first subset of PSSs.

2. The method of claim 1, wherein assessing each FHP of the set of FHPs to select the first subset of PSSs, comprises:
determining that the each FHP meets a predefined hit probability criterion;
identifying, based on the determining, each PSS associated with the each FHP as a fingerprint query recipient; and
including, based on the identifying, the each PSS into the first subset of PSSs.

3. The method of claim 1, further comprising:
prior to generating the first fingerprint query:
determining that the first fingerprint is not stored in a local fingerprint database,
wherein, in response to the determining, the first fingerprint query is generated.

4. The method of claim 1, further comprising:
after obtaining the first data chunk:
generating, in a local data chunk database, a first database entry comprising a new storage ID and the first data chunk;
generating, in a local fingerprint database, a second database entry comprising the first fingerprint and the new storage ID; and
issuing, to the client, a backup response indicating that a data chunk corresponding to the first fingerprint is already stored.

5. The method of claim 1, further comprising:
after obtaining the first data chunk:
receiving, from the client, a second backup request comprising a second fingerprint;
generating a second fingerprint query comprising the second fingerprint;
transmitting the second fingerprint query to a second subset of PSSs of the set of PSSs;
receiving a set of query responses from the second subset of PSSs;
determining, based on the set of query responses, that none of the PSS of the second subset of PSSs contains the second fingerprint; and
obtaining, in response to the determining, a second data chunk associated with the second fingerprint from the client.

6. The method of claim 1, further comprising:
after obtaining the first data chunk:
receiving, from the client, a second backup request comprising a second fingerprint;
determining that the second fingerprint is stored in a local fingerprint database; and
issuing, in response to the determining and to the client, a backup response indicating that a data chunk corresponding to the second fingerprint is already stored.

7. A system, comprising:
a set of protection storage systems (PSSs); and
a client operatively connected to the set of PSSs by way of a wide area network (WAN),
wherein a first PSS of the set of PSSs comprises a non-transitory computer readable medium (CRM) comprising computer readable program code, which when executed by the first PSS, enables the first PSS to perform a method comprising:
performing an optimization protocol by maintaining a fingerprint hit probability (FHP), for each PSS of the set of PSSs to obtain a set of FHPs, wherein the FHP is a ratio of a number of query responses indicating a fingerprint match to a number query of responses indicating no fingerprint match;
selecting, based on the FHPs, a first subset of PSSs of the set of PSSs;
receiving, by the first PSS, a first backup request from the client, wherein the first backup request comprises a first fingerprint, wherein the first fingerprint is a digital signature that uniquely identifies a first data chunk;
generating a first fingerprint query comprising the first fingerprint;
transmitting the first fingerprint query to the first subset of PSSs of the set of PSSs, wherein the first PSS and the first subset of PSSs are connected via a local area network (LAN);
obtaining, in response to the first fingerprint query and from a second PSS of the first subset of PSSs, the first data chunk; and
updating, in response to obtaining the first data chunk from the second PSS, a fingerprint hit probability (FHP) associated with the second PSS,
wherein the performing of the optimization protocol further comprises:
receiving a set of backup requests from the client, wherein a cardinality of the set of backup requests meets a predefined request count criterion;
maintaining, based on the set of backup requests, the FHP for each PSS of the set of PSSs to obtain the set of FHPs; and
assessing each FHP of the set of FHPs to select the first subset of PSSs.

8. The system of claim 7, wherein the system is deployed as a data deduplication system.

9. A non-transitory computer readable medium (CRM) comprising computer readable program code, which when executed by a computer processor, enables the computer processor to perform a method for implementing data chunk transfer by a Protection Storage System (PSS), the method comprising:
performing an optimization protocol by maintaining a fingerprint hit probability (FHP), for each PSS of a set of PSSs to obtain a set of FHPs, wherein the FHP is a ratio of a number of query responses indicating a fingerprint match to a number query of responses indicating no fingerprint match;
selecting, based on the FHPs, a first subset of PSSs of the set of PSSs;
receiving, by a first protection storage system (PSS), a first backup request from a client, wherein the first backup request comprises a first fingerprint, wherein the first fingerprint is a digital signature that uniquely identifies a first data chunk, wherein the client and the first PSS are connected via a wide area network (WAN);
generating a first fingerprint query comprising the first fingerprint;

transmitting the first fingerprint query to the first subset of PSSs, wherein the first PSS and the first subset of PSSs are connected via a local area network (LAN);

obtaining, in response to the first fingerprint query and from a second PSS of the first subset of PSSs, the first data chunk; and updating, in response to obtaining the first data chunk from the second PSS, a fingerprint hit probability (FHP) associated with the second PSS, wherein the performing of the optimization protocol further comprises:

receiving a set of backup requests from the client, wherein a cardinality of the set of backup requests meets a predefined request count criterion;

maintaining, based on the set of backup requests, the FHP for each PSS of the set of PSSs to obtain the set of FHPs; and assessing each FHP of the set of FHPs to select the first subset of PSSs.

10. The non-transitory CRM of claim 9, wherein the method further comprises:

determining that the each FHP meets a predefined hit probability criterion;

identifying, based on the determining, each PSS associated with the each FHP as a fingerprint query recipient; and including, based on the identifying, the each PSS into the first subset of PSSs.

11. The non-transitory CRM of claim 9, wherein the method further comprises:

prior to generating the first fingerprint query:

determining that the first fingerprint is not stored in a local fingerprint database, wherein, in response to the determining, the first fingerprint query is generated.

12. The non-transitory CRM of claim 9, wherein the method further comprises:

after obtaining the first data chunk:

generating, in a local data chunk database, a first database entry comprising a new storage ID and the first data chunk;

generating, in a local fingerprint database, a second database entry comprising the first fingerprint and the new storage ID; and issuing, to the client, a backup response indicating that a data chunk corresponding to the first fingerprint is already stored.

13. The non-transitory CRM of claim 9, wherein the method further comprises:

after obtaining the first data chunk:

receiving, from the client, a second backup request comprising a second fingerprint;

generating a second fingerprint query comprising the second fingerprint;

transmitting the second fingerprint query to a second subset of PSSs of the set of PSSs;

receiving a set of query responses from the second subset of PSSs;

determining, based on the set of query responses, that none of the PSS of the second subset of PSSs contains the second fingerprint; and obtaining, in response to the determining, a second data chunk associated with the second fingerprint from the client.

14. The non-transitory CRM of claim 9, wherein the method further comprises:

after obtaining the first data chunk:

receiving, from the client, a second backup request comprising a second fingerprint;

determining that the second fingerprint is stored in a local fingerprint database; and issuing, in response to the determining and to the client, a backup response indicating that a data chunk corresponding to the second fingerprint is already stored.

* * * * *

UNITED STATES PATENT AND TRADEMARK OFFICE
CERTIFICATE OF CORRECTION

PATENT NO. : 11,113,153 B2
APPLICATION NO. : 15/661682
DATED : September 7, 2021
INVENTOR(S) : Natanzon et al.

It is certified that error appears in the above-identified patent and that said Letters Patent is hereby corrected as shown below:

In the Claims

Column 17, Line 16 in Claim 2, the phrase "determining that the each FHP" should read
-- determining that each FHP --.

Column 17, Line 19 in Claim 2, the phrase "with the each FHP meets" should read -- with each FHP meets --.

Column 19, Line 22 in Claim 10, the phrase "determining that the each FHP" should read
-- determining that each FHP --.

Column 19, Line 25 in Claim 10, the phrase "with the each FHP meets" should read -- with each FHP meets --.

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*